United States Patent
Boecker et al.

(10) Patent No.: US 10,589,738 B1
(45) Date of Patent: Mar. 17, 2020

(54) ELECTRONIC BRAKING SYSTEMS AND METHODS

(71) Applicant: Zoox, Inc., Menlo Park, CA (US)

(72) Inventors: Moritz Boecker, Millbrae, CA (US); Ryan O'Leary Flatland, Foster City, CA (US); Paul Choin, Pleasanton, CA (US)

(73) Assignee: Zoox, Inc., Foster City, CA (US)

(*) Notice: Subject to any disclaimer, the term of this patent is extended or adjusted under 35 U.S.C. 154(b) by 205 days.

(21) Appl. No.: 15/705,851

(22) Filed: Sep. 15, 2017

(51) Int. Cl.
| | |
|---|---|
| *B60W 30/02* | (2012.01) |
| *B60W 10/18* | (2012.01) |
| *B60W 10/20* | (2006.01) |
| *F16D 121/24* | (2012.01) |
| *F16D 65/00* | (2006.01) |
| *F16D 65/18* | (2006.01) |

(52) U.S. Cl.
CPC ............ *B60W 30/02* (2013.01); *B60W 10/18* (2013.01); *B60W 10/20* (2013.01); *B60W 2520/10* (2013.01); *B60W 2520/26* (2013.01); *B60W 2520/28* (2013.01); *B60W 2710/18* (2013.01); *B60W 2710/20* (2013.01); *F16D 65/0068* (2013.01); *F16D 65/18* (2013.01); *F16D 2121/24* (2013.01)

(58) Field of Classification Search
CPC .. B60T 8/172; B60T 2210/22; B60T 2230/03; B60T 2240/06; B60T 8/243; B60T 8/1755; B60T 8/00; B60T 8/261
See application file for complete search history.

(56) References Cited

U.S. PATENT DOCUMENTS

| | | | |
|---|---|---|---|
| 2002/0047305 A1* | 4/2002 | Yokoyama | B60T 8/17616 303/163 |
| 2014/0207355 A1* | 7/2014 | Akaho | B60T 8/17 701/71 |
| 2016/0221446 A1* | 8/2016 | Suzuki | B60L 15/20 |
| 2019/0084543 A1* | 3/2019 | Bai | B60T 13/741 |

* cited by examiner

*Primary Examiner* — Redhwan K Mawari
(74) *Attorney, Agent, or Firm* — Lee & Hayes, P.C.

(57) ABSTRACT

An electronic braking system with independent antilock braking and stability control. The system can utilize a variety of electro-mechanical actuators to apply clamping force to a mechanical brake caliper. The system can include a caliper electronic control unit (CECU) and a wheel speed sensor at each wheel of the vehicle to enable independent slip control, or antilock braking, at each wheel. A separate executive management unit (EMU) can receive data from each electronic caliper, vehicle accelerometers, and other sensors to provide electronic stability control (ESC) independent of antilock braking (ABS) functions. The removal of a conventional master cylinder, brake pedal, ABS pump, brake lines, and other components can reduce weight and complexity. The elimination of hydraulic lines running to a central ABS module and master cylinder can enable modular drive units to be swapped out more quickly and efficiently.

19 Claims, 12 Drawing Sheets

To Fig. 7B

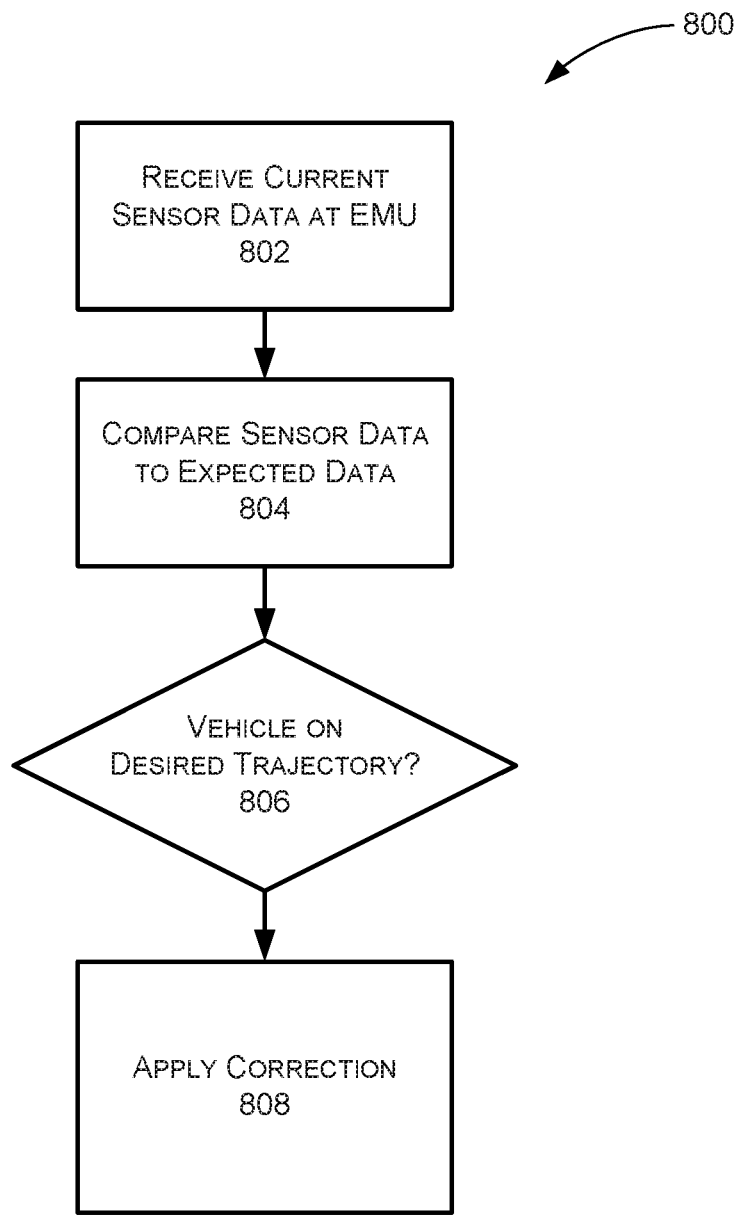

ELECTRONIC BRAKING SYSTEMS AND METHODS

BACKGROUND

Conventional antilock braking systems (ABS) and electronic stability control (ESC) use a combination of electronic and hydraulic components to function. ABS generally uses three or four wheel speed sensors, for example, to sense when one or more wheels have exceeded the limits of traction between the tire and the road (or other) surface during heavy braking and then reduces braking pressure to wheels that are, or are in danger of, "locking up." Similarly, ESC uses wheel speed sensors, accelerometers, and other sensors to determine when the vehicle has, or imminently will, lose traction (e.g., oversteer or understeer) due to braking and/or steering inputs and selectively applies braking in an attempt to regain control of the vehicle.

In both cases, the systems use electro-hydraulic actuators to control wheel speed. The ABS electro-hydraulic actuator, for example, tends to "hammer" the pressure rapidly back and forth between the commanded pressure (i.e., a maximum brake line pressure) and a lower pressure designed to reduce or eliminate the wheel slip at a particular wheel. ESC also uses an electrohydraulic actuator and a hydraulic accumulator to increase the brake pressure at one or more wheels to slow those wheels down to create a torque around the vehicle's vertical axis, for example, to counter excessive yaw.

Conventional ABS and ESC systems use multiple complex systems with hydraulic and mechanical means to provide the desired functions. These conventional ABS and ESC systems tend to be overly complicated, heavy, and expensive.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 8 depicts a method of using an electronic braking system for electronic stability control (ESC) that is independent of antilock braking, in accordance with some examples of the present disclosure.

DETAILED DESCRIPTION

Figure 1:
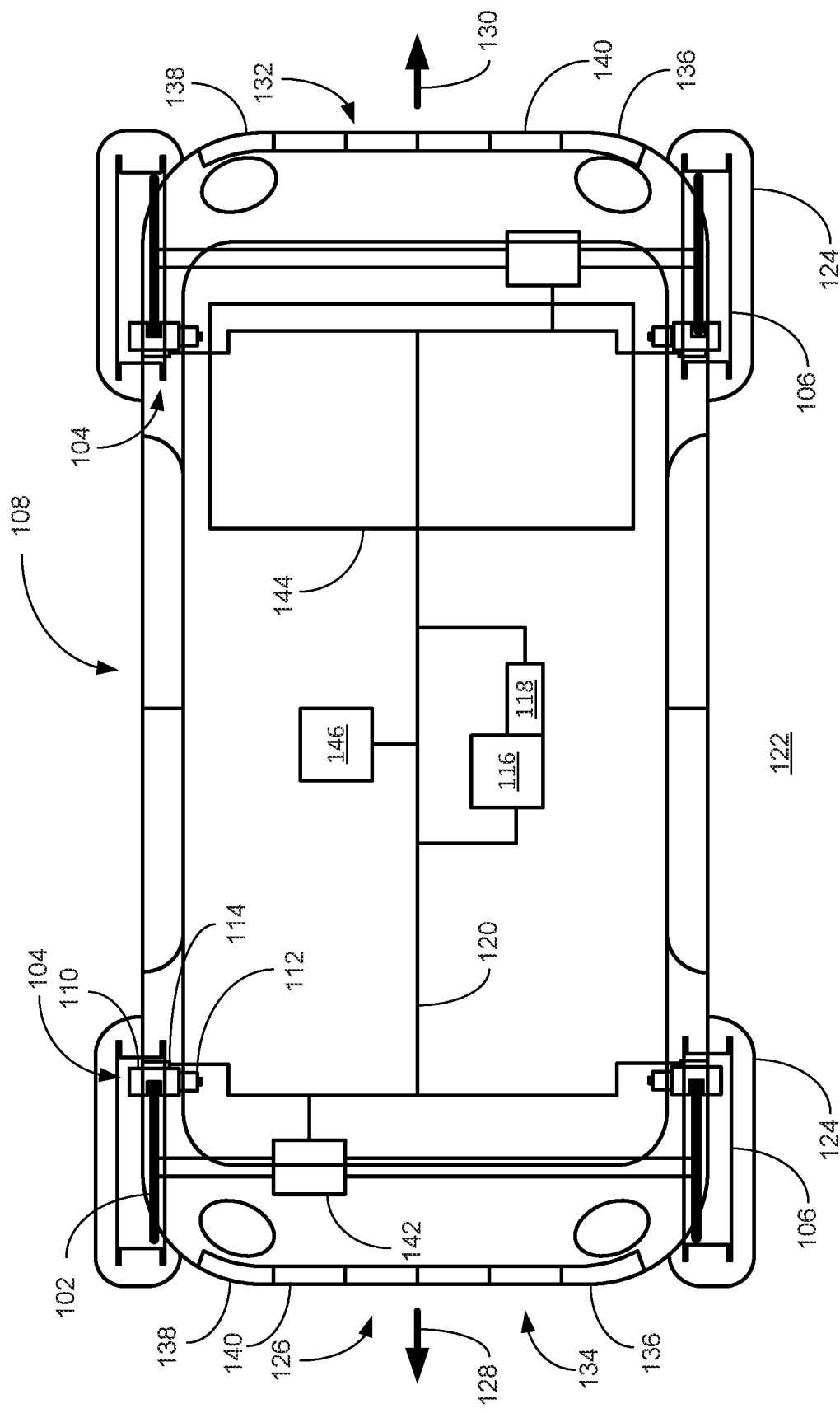
FIG. 1 is a schematic top view of an example vehicle with an electronic braking system, in accordance with some examples of the present disclosure.

As mentioned above, antilock braking systems (ABS) and electronic stability control (ESC) tend to be heavy, expensive, and complicated. Because these systems combine electronic control with electro-mechanical and hydraulic actuation, a number of components are required for the systems to function. ABS typically uses a large pump, multiple solenoids, and a pressure accumulator to modulate hydraulic line pressure to individual brake lines going to hydraulic brake calipers located at the four corners of the vehicle. ABS is plumbed in-line with a conventional braking system comprising a master cylinder (with brake pedal), hydraulic brake lines, and a hydraulic brake caliper at each wheel. Thus, the components of the ABS are in addition to the conventional brake components adding weight and complexity.

ABS typically uses a tone ring (a ring with multiple teeth) located at the wheel and rotating at the same speed as the wheel. The speed of the wheel is determined with a magnetic wheel speed sensor that measures the frequency of the change in magnetic field caused by the teeth on the tone ring passing the sensor. The ABS can then compare the wheel speed at each wheel to determine if one wheel is "locking up." If the difference in speed between a first wheel and the other three wheels reaches a predetermined threshold, the ABS activates an electrohydraulic solenoid that rapidly opens and closes to bleed pressure off of the hydraulic brake line feeding the brake caliper at the wheel. The rapid opening and closing of the actuator generally manifests itself to the user as a hammering, or vibration, in the brake pedal accompanied by a thrumming sound from the ABS pump.

Because ESC and ABS use an electronic controller, sensors, and actuators to control a hydraulic braking system, however, these systems tend to be complicated to manufacture and implement and prone to leaks and failures. These systems use electronic, electro-mechanical, and hydraulic components within the same system. The interface between electronic and hydraulic control requires electronic actuators that can open under the extreme pressures (upwards of 2000 psi), for example, and components that are resistant to the relatively caustic brake fluid, among other things. In addition, the components must be robust and reliable, further increasing cost and complexity.

In addition, the use of hydraulic actuation makes vehicle modularity difficult. This application describes examples in which vehicles can include interchangeable drive modules that can be swapped out for maintenance and other reasons. Performing these operations with hydraulic brake lines means disconnecting brake lines, reconnecting brake lines, and bleeding the hydraulic system of air, which increases the time and complexity of the operation. In addition, brake fluid is caustic and irritates skin, damages paint, and is simply messy.

Hydraulic brakes have long been used on vehicles, at least in part, because they enable the hydraulic pressure necessary to stop a vehicle. In other words, the master cylinder and brake caliper pistons or wheel cylinders can be sized to provide the desired amount of force multiplication to enable a relatively small force at the brake pedal to be multiplied by relatively larger caliper pistons, for example, to provide a higher force on the brake pads. In addition, a hydraulic system enables the user to feel and modulate the braking force in a way that electronic brakes may not provide.

This application describes examples that employ localized, rather than centralized, systems to decrease the weight, complexity, and cost of the system, while increasing control and modularity, as well as redundancy for safety. In some examples, electro-mechanical actuation may be used and the hydraulic portion of the system to be eliminated. Indeed, removing the hydraulic components of the system enables the number and complexity of the components in the system to be reduced and the majority of the components to be located proximate the wheels. The use of the system in automated vehicles also obviates the need for the pedal feel provided by a hydraulic braking system.

In addition, automated electric or hybrid vehicles significantly reduce the duty cycle of the mechanical brakes. In other words, automated vehicles provide improved control when compared to manually driven vehicles (i.e., vehicle driven by humans) because they do not get distracted and may have enhanced perception of the world around them; thus, reducing the need for "panic braking." In addition, electric vehicles can utilize regenerative braking for a majority of braking duties. As a result, electronic components—that may not survive the heat and other harsh conditions of a conventional hydraulic braking system—can be located directly on the caliper (or nearby) improving performance. These and other examples and benefits are described further with respect to the following figures.

For the sake of clarity and ease of explanation, the term "steering angle" is used below to describe a steering input created by turning one or more wheels on a vehicle to affect a turn or a "crab." On a vehicle with front wheel only steering, for example, this can be represented as the average angle of the two front wheels, which are different to account for Ackerman geometry. For a vehicle with four wheel steering, on the other hand, this concept is somewhat more complicated, as the rear wheels can be steered in the same direction as the front wheels at high speeds to promote stability, for example, and the rear wheels can be steered in the opposite direction to the front wheels at low speeds to induce rotation and tighten turning radiuses, among other things. Thus, one of skill on the art will recognize that the term steering angle is used herein to represent the overall steering input used to change the position and/or orientation of the vehicle.

FIG. 1 illustrates an example vehicle having an electronic braking system 100. The electronic braking system 100 can comprise a brake rotor 102 and electronic brake caliper assembly 104 located at each wheel 106 of the vehicle 108. Each electronic brake caliper assembly 104 can comprise a caliper 110, a brake actuator 112, and a caliper electronic control unit (CECU) 114. The electronic braking system 100 can also include a primary executive motion unit (EMU) 116 and a secondary EMU 118 connected to each caliper via a suitable communications network 120 (e.g., a controller area network (CAN), or any other suitable wired or wireless communication).

In some examples, the electronic braking system 100 can be used on an automated vehicle 108 configured to travel across an area 122 (e.g., a road surface), for example, to transport people and/or cargo from a first location to a second location. For the purpose of illustration, the electronic braking system 100 can be used on the vehicle 108, which may be an autonomous vehicle configured to operate according to a Level 5 classification issued in 2016 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied.

This is merely an example, however, and the systems and methods described herein may be incorporated into any ground-borne vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicle 108 shown in FIG. 1 is an automobile having four wheels 106 and respective tires 124 for each of the wheels 106. Other types and configurations of vehicles are contemplated, such as, for example, vans, sport utility vehicles, crossover vehicles, trucks, buses, agricultural vehicles, and construction vehicles. The vehicle 108 may be powered by one or more internal combustion engines, electric motors powered by one or more power supplies (e.g., batteries, hydrogen fuel cells, etc.), or any combination thereof. In addition, although the example vehicle 108 has four wheels, the systems and methods described herein may be incorporated into vehicles having fewer or a greater number of wheels, tires, and/or tracks. The example vehicle 108 has four-wheel steering and may operate generally with equal performance characteristics in all directions, for example, such that a first end 126 of the vehicle 108 is the front end of the vehicle 108 when traveling in a first direction 128, and such that the first end 126 becomes the rear end of the vehicle 108 when traveling in the opposite, second direction 130, as shown in FIG. 1. Similarly, a second end 132 of the vehicle 108 is the front end of the vehicle 108 when traveling in the second direction 130, and such that the second end 132 becomes the rear end of the vehicle 108 when traveling in the opposite, first direction 128. These example characteristics may facilitate greater maneuverability, for example, in small spaces or crowded environments, such as parking lots and urban areas.

In the example shown in FIG. 1, the electronic braking system 100 can also comprise a pair of sensor arrays 134, which may include, for example, one or more image sensors 136, RADAR sensors 138, and/or LIDAR sensors 140 mounted on the vehicle 108. The sensors 136, 138, 140 of the sensor arrays 134 may be arranged in a predetermined pattern, for example, in order to provide a desired area of coverage for the area 122 proximate the vehicle 108. In some examples, as shown, the sensors 136, 138, 140 can be disposed in a pattern that enables approximately 360-degree coverage around the vehicle 108. This can enable the vehicle 108 to detect objects regardless of which direction 128, 130 the vehicle 108 is traveling. This can also enable the electronic braking system 100 to detect objects approaching from the sides of the vehicle 108 (e.g., a dog, or another animal, running into the street). Other patterns and arrangements of the sensors 136, 138, 140 are contemplated.

The imager sensors 136 may be any known types of digital image sensors, digital or analog cameras, and/or digital or analog video cameras. The imager sensors 136 may be high dynamic range (HDR) cameras, for example, to provide improved accuracy of the images. In some examples, the imager sensors 136 may include one or more of light-sensitive cameras, range sensors, tomography devices, RADAR, and/or ultra-sonic cameras. Other suitable types of imagers are contemplated. The imager sensors 136 may be selected to provide two-dimensional (2-D) image data, two and a half-dimensional (2.5d, or depth maps), and/or three-dimensional (3D) image data, image sequences, gray image data, and/or color image data. In some examples, the imager sensors 136 may be selected to provide depth data, absorption data, and/or reflectance data.

As shown in FIG. 1, the example sensor arrays 134 may be mounted to a portion of the vehicle 108 that provides a line-of-site view of a portion of the area 122 around the vehicle 108, with at least a portion of the sensors 136, 138, 140 pointed in the direction of travel. While two sensor arrays 134 are illustrated, in other examples vehicles may include any number of one or more sensor arrays. Moreover, in some examples, the individual sensors 136, 138, 140 may be located separately from one another and on different parts of the vehicle, rather than being incorporated into an array as shown. As shown, each example sensor array 134 can be mounted proximate one end 126, 132 of the vehicle 108. The sensor array 134 may be mounted at a location generally corresponding to the upper edge of the windshield, for example, either outside or inside the windshield. In examples in which the sensor array 134 is mounted inside the windshield, any distortion of the images resulting from the windshield may be corrected, for example, via lenses or algorithms configured to correct the image data. If the vehicle 108 were to include two windshields due to being bi-directional (like the example vehicle 108), each sensor array 134 could be mounted at a location generally corresponding to the upper edge of the windshield, on the bumpers, or in another suitable location. In some examples where the vehicle 108 is a Level 4 or 5 vehicle, the vehicle 108 may not have windshields. In such an example, the sensor array 134 may be disposed about the vehicle so as to create an optimal field coverage. According to some examples, sensor arrays 134 may additionally or alternatively be mounted to capture images of the area 122 in the paths of each tire 124, or on each side of the vehicle 108. In some examples, the vehicle 108 can be an autonomous electric vehicle with one or more drive motors 142, a battery 144, and a motor controller 146, among other things.

Regardless of the vehicle 108, each electronic brake caliper assembly 104 can be activated independently of the other electronic brake caliper assemblies 104. This enables ABS and ESC functions to be separated between the CECUs (ABS) and the EMUs 116, 118 (ESC). So, for example, each electronic brake caliper assembly 104 can provide independent slip control at each wheel 106 using the CECU 114, while the EMU 116 can provide overall ESC using the electronic brake caliper assemblies 104 independently, or in concert.

In some examples, the primary EMU 116 and secondary EMU 118 may be redundant and provide redundant signals when operating properly. In other words, both EMUs 116, 118 can have the same functions and capabilities and be capable of independent control of the vehicle 108. Indeed, in some examples, identical input from both EMUs 116, 118 may be used for a particular action to provide a functionality check. In other words, if the CECU 114 receives contradictory commands from the EMUs 116, 118, the CECU 114 may ignore the commands and enter a failsafe mode. In the failsafe mode, the CECU 114 may automatically bring the vehicle 108 to a stop at some preset failsafe slip rate (e.g., 0.15 or 0.2), for example, the current target slip rate, or at the maximum slip rate.

In other examples, the secondary EMU 118 can take a "back-up" role and may have reduced functionality and/or complexity in comparison to the primary EMU 116. Thus, a failure of the primary EMU 116 may trigger a "limp" mode, in which certain ABS or ESC functions are deactivated, speed is reduced, and safety thresholds are raised until a repair to the primary EMU 116 can be effected. In some examples, the limp mode may reduce the vehicle speed at some preset slip rate, for example, pull into a parking spot, or take some other action. In some examples, the vehicle 108 can send a signal to a central control to begin "teleoperation"—e.g., a human or machine operator manually controls the vehicle 108 by remote control to a safe location.

Figure 2:
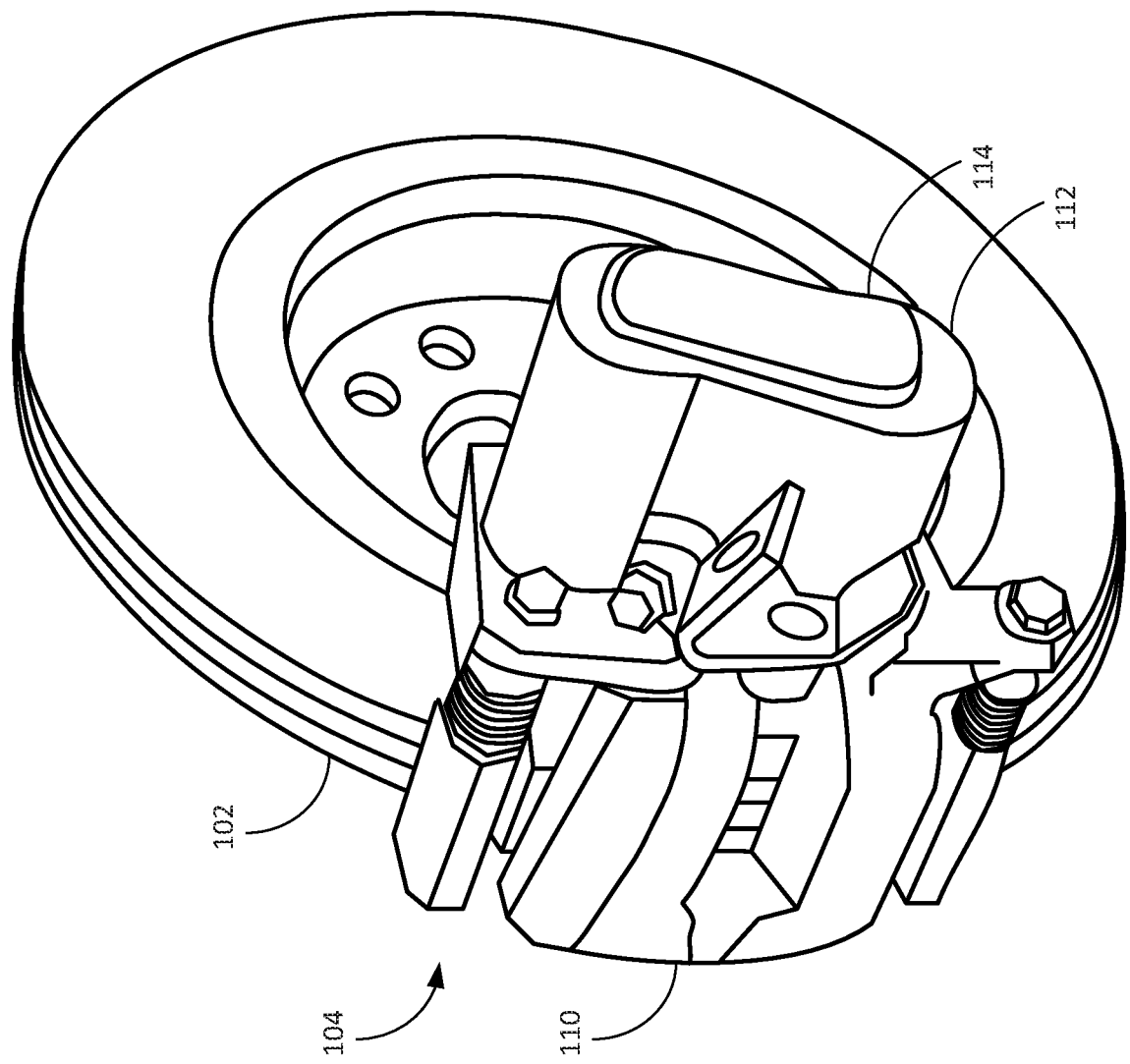
FIG. 2 is a perspective view of an electronic brake caliper, in accordance with some examples of the present disclosure.

FIG. 2 is a detail view of the electronic brake caliper assembly 104, showing the caliper 110, brake actuator 112, and dedicated CECU 114. As noted above, rather than using hydraulic pressure to provide the desired clamping force between the pads (not visible) and brake rotor 102, the electronic brake caliper assembly 104 can instead use brake actuator 112. The brake actuator 112 can comprise an electric motor, linear actuator, shape memory alloy (SMA), solenoid, or another electro-mechanical device capable of providing the desired clamping force between the pads and the brake rotor 102. In some examples, the brake actuator 112 can comprise a servo motor driving a worm gear, for example, with the worm gear driving a brake piston. In other examples, the brake actuator 112 can comprise a small hydraulic pump to provide conventional, but localized, hydraulic braking. In other examples, the brake actuator 112 can comprise a linear actuator acting directly on the brake pads. In still other examples, the actuator can comprise a cam rotated by a motor to provide the desired clamping force.

Figure 3:
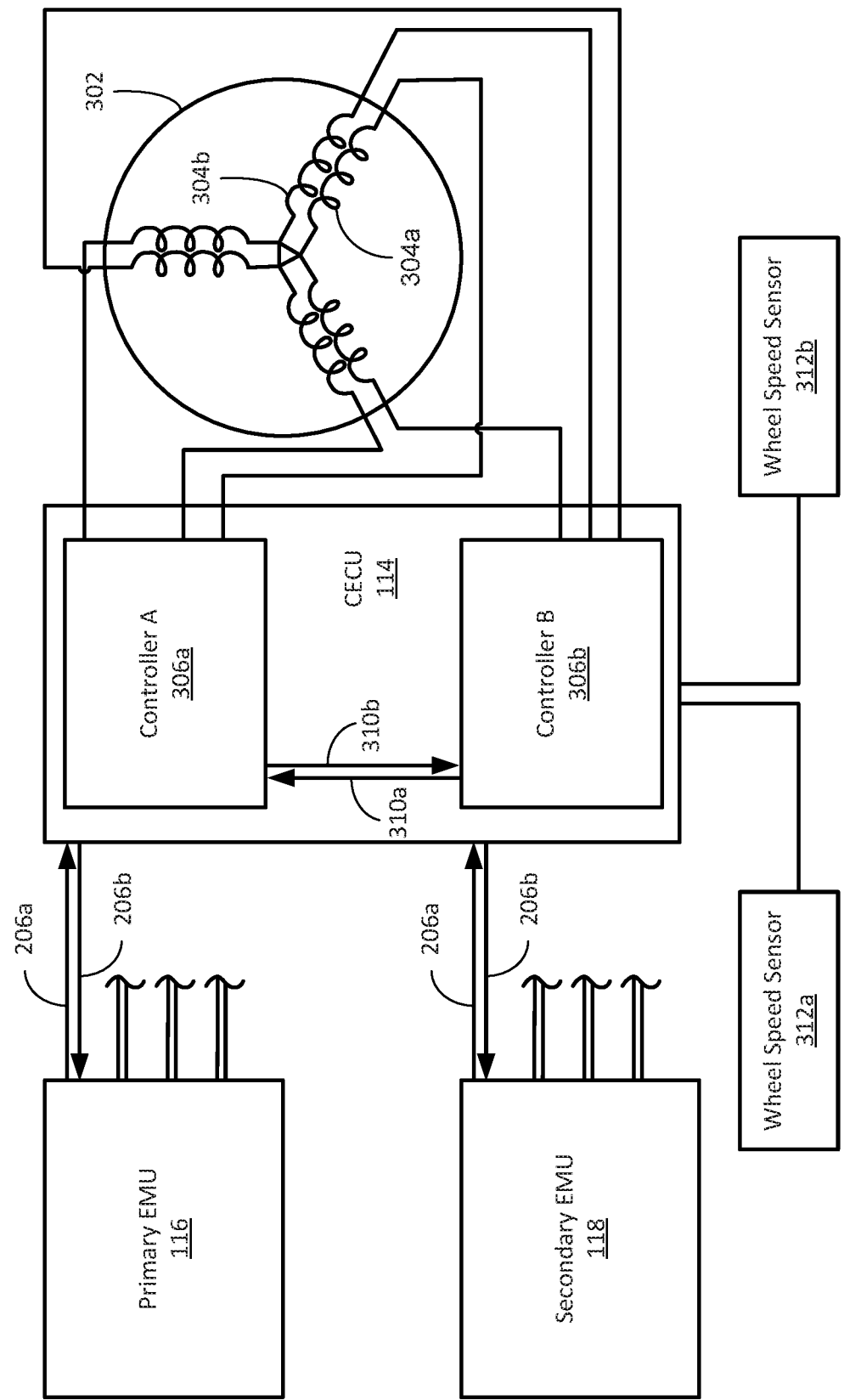
FIG. 3 is a schematic of the electronic components of an electronic braking system, in accordance with some examples of the present disclosure.

FIG. 3 is a schematic diagram illustrating an example of the CECU 114. The CECU 114 can comprise a microprocessor with built-in redundancy to provide brake force control and wheel slip control. As shown in FIG. 3, in some examples, the brake actuator 112 can comprise, in part, an electric motor 302, such as, for example, a direct current (DC), brushless DC (BLDC), or alternating current (A/C) motor. To provide redundant operation and high-performance, the electric motor 302 can comprise two or more windings 304a, 304b each with a separate controller 306a, 306b in the CECU 114. Thus, a first controller 306a can control a first set of windings 304a and a second controller 306b can control a second set of windings 304b in the motor 302.

Each controller 306 can control a set of windings 304 independently, though the windings 304 can generally be activated simultaneously for improved performance and increased clamping force. In some examples, for redundancy, each winding 304 and controller 306 can nonetheless be capable of independently and quickly providing the desired amount of clamping force on the brake rotor 102. In other words, each winding 304 is capable of independently fully braking or "locking" the wheel 106. Multiple windings 304 and controllers 306, however, provide both redundancy and high-performance. Redundancy is provided because if one winding 304 and/or one controller 306 fails, the remaining winding 304 and controller 306 can provide clamping force sufficient to brake the wheel. Performance is improved because activating both windings 304 can increase the rate and/or magnitude of the clamping force generated.

Figure 4:
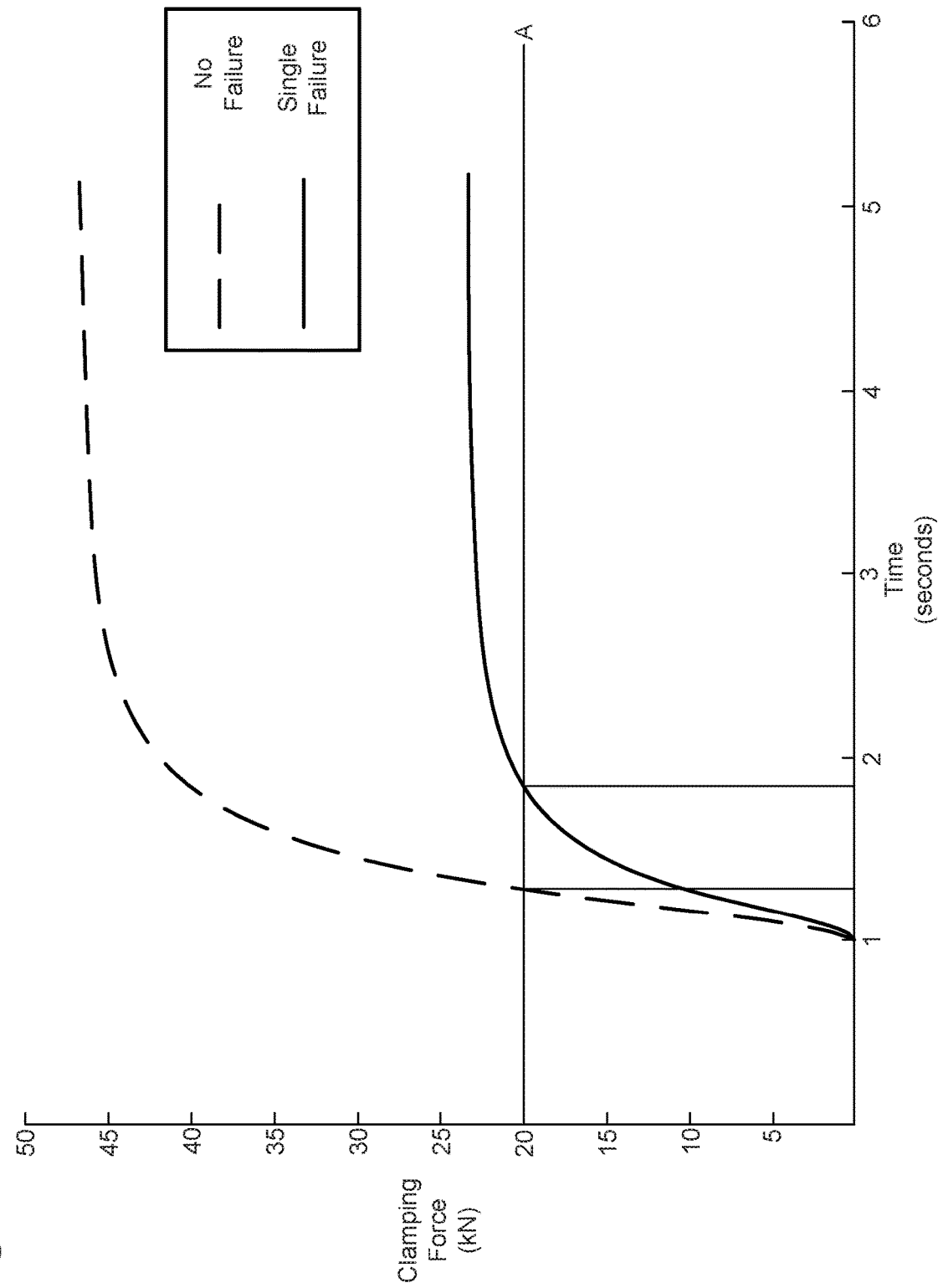
FIG. 4 is a graph comparing the clamping force of the electronic braking system during normal operation to the braking system during a single coil or controller failure, in accordance with some examples of the present disclosure.

As discussed below with respect to FIG. 4, activating both windings 304 at the same time reduces the time required to achieve the desired clamping force, up to and exceeding wheel lock. Thus, stopping distances can be somewhat shortened by activating both windings 304 at the same time. It should be noted, however, that this performance may only be used in the case of emergency stops (e.g., to avoid an accident), which in the context of autonomous vehicles should be fairly rare. Indeed, for autonomous electric vehicles, a vast majority of braking can be provided with regenerative braking from the drive motors.

The CECU 114 can be in communication with the EMUs 116, 118 via the communication network 120 to send and receive data 308. The CECU 114 can receive data 308a from the EMUs 116, 118 related to, for example, vehicle speed, braking torque commanded, and the target slip ratio that should be allowed. Of course, in an autonomous vehicle 108, the CECU 114 could receive a plethora of other data including, for example, expected wheel speed, expected trajectory, expected yaw rate, pose and/or position data, etc. The CECU 114, in turn, can send data 308b to provide wheel speed and actual slip rate for the respective wheel 106 (or tire 124) to the EMUs 116, 118, among other things. Thus, while the CECU 114 is capable of independent ABS control for the wheel 106, the EMUs 116, 118 may nonetheless use this data 308b for ESC, logging, and/or other functions.

In some examples, the controller 306 can also be in communication within the CECU 114. In other words, the CECU 114 can include an internal bidirectional communications pathway 310a, 310b to enable the controllers 306 to communicate with each other internally. In this manner, if the data link 308 between one of the controllers 306 and one of the EMUs 116, 118 fails, the remaining controller 306—the controller 306 that is still in communication with the EMUs 116, 118—can provide any relevant information to the controller 306 that has lost communications.

One of skill in the art will recognize that the slip ratio is a ratio of the wheel speed to the vehicle's speed. This can be accomplished by comparing the wheel's angular speed to the known angular speed for the wheel 106 for pure rolling at a given vehicle speed. The slip ratio can be expressed generally using Equation 1:

$$S = \frac{V_V - V_T}{V_V} = 1 - \frac{\omega R_T}{V_V}$$

where $V_V$ is the vehicle speed and $V_T$ is the wheel 106 (or tire 124) speed. Thus, for a wheel that is spinning (e.g., doing a "burnout" or spinning on ice) the slip ratio is negative and for a wheel that is sliding (e.g., skidding), the slip ratio is positive. Consequently, a slip ratio of 1 indicates the wheel is completely locked (i.e., $\omega R_T$=0). A zero slip ratio (wheel speed=vehicle speed) indicates that the wheel is rolling and no slip is present.

The target slip ratio can be calculated based on the current conditions, whether the vehicle 108 is occupied, and how quickly the vehicle 108 needs to stop, among other things. The target slip ratio is dependent on the tire compound, road surface, weather conditions, and other factors. The target slip ratio can be calculated in a number of ways. Because each electronic brake caliper assembly 104 can be controlled independently, for example, the EMU 116 can send a signal to a single CECU 114 to gradually apply a braking force until the wheel 106 on that corner locks. At some point between no braking force and the wheel 106 locking up, there will be a maximum braking force.

This braking force can be measured in a number of ways. The force can be measured using an accelerometer, for example, to measure the effect of the braking force on vehicle dynamics. The force can be derived using a strain gauge on the suspension. The force can also be derived by applying differential power to another wheel 106 to measure the force required to counteract the braking force. The force can also be derived by applying power and braking at the same wheel, but a constant wheel speed (i.e., such that the two forces are in equilibrium), and estimating the torque applied by the motor based on the motor characteristics and the current draw of the motor. Other techniques could also be used and are contemplated herein.

The target slip ratio can also be calculated by estimating the friction of the road surface periodically. Example methods that use imagers and other sensors to estimate road surface friction is discussed in detail in U.S. patent application Ser. No. 15/281,416, filed Sep. 30, 2017, entitled, "Estimating Friction Based on Image Data" and U.S. application Ser. No. 15/491,346 filed on Apr. 19, 2017 entitled "Perception Based Suspension Control," which are hereby incorporated by reference. Using the estimated friction of the road surface can enable the EMU 116 to relatively accurately calculate the target slip ratio that will provide the minimum stopping distance.

The target slip ratio can also be calculated periodically using the electronic brake caliper assembly 104. In other words, the CECU 114 can gradually apply a braking force to the brake rotor 102 of one wheel 106 until the wheel 106 locks. At the point of lock-up, this will tend to happen in a non-linear manner—i.e., the wheel speed will slow in a linear manner until it locks, which tends to happen suddenly. The slip ratio immediately preceding lock-up, or some percentage thereof (e.g., 90 or 95%), can be used to set the target slip ratio. This procedure may be performed from time to time based in a change in temperature, for example, rain, or other changing conditions.

Each CECU 114, on the other hand, can independently calculate, and control, the actual slip for the respective wheel 106 using vehicle velocity data from the EMU 116 and wheel speed data from one or more wheel speed sensor(s) 312. In some examples, as shown, the system 100 can include two wheel speed sensors 312a, 312b to provide redundancy. If there is a discrepancy between the two wheel speed sensors 312, for example, the CECU 114 for that wheel 106 may enter a failsafe mode until the malfunction can be resolved. This enables each CECU 114 to provide independent slip control at each wheel 106 and separates ABS from ESC functions. In addition, actual slip data can be sent to the EMU 116 for use in ESC algorithms, among other things.

In other examples, each CECU 114 can control wheel slip independently without the vehicle speed or slip ratio from the EMU 116. In other words, the CECU 114 can independently apply a braking force to the brake rotor 102 and compare the resultant wheel speed or deceleration rate—with data from the wheel speed sensor(s) 312—to an expected wheel speed or deceleration rate for the applied braking force. The braking force can then be adjusted with a correction factor based on current conditions—e.g., higher for hot, dry conditions, and lower for wet conditions.

As mentioned above, and shown in FIG. 4, failure of one winding 304 in the motor 302 or one controller 306 does not cause brake failure. Instead, braking performance is only marginally affected. In this example, the target clamping force for the caliper is approximately 20 kN (Line A). This may be at the point of wheel lock, for example, or for a particular slip ratio. Of course, this clamping force is for discussion only, and clamping forces for various vehicles can be vastly different. The clamping force required to stop a semi-truck, for example, may be orders of magnitude higher than that for a motorcycle. Thus, this example is intended to be explanatory and not limiting. Regardless, as shown, a single winding 304/controller 306 is independently capable of generating the desired clamping force, albeit somewhat more slowly than dual windings 304/controllers 306. Dual windings 304 and controllers 306, on the other hand, improve time to the desired clamping force, and are capable of far exceeding this clamping force.

Advantageously, the difference between no failure braking and single failure braking (e.g., failure of one winding 304 or one controller 306) is approximately half a second. In addition, it would be uncommon for more than one electronic brake caliper assembly 104 to fail at the same time. Thus, the remaining three electronic brake caliper assemblies 104 can operate at full power further minimizing impact of the failure. Finally, as mentioned above, this type of failure would only impact panic braking, which is uncommon in autonomous vehicles.

Figure 5A:
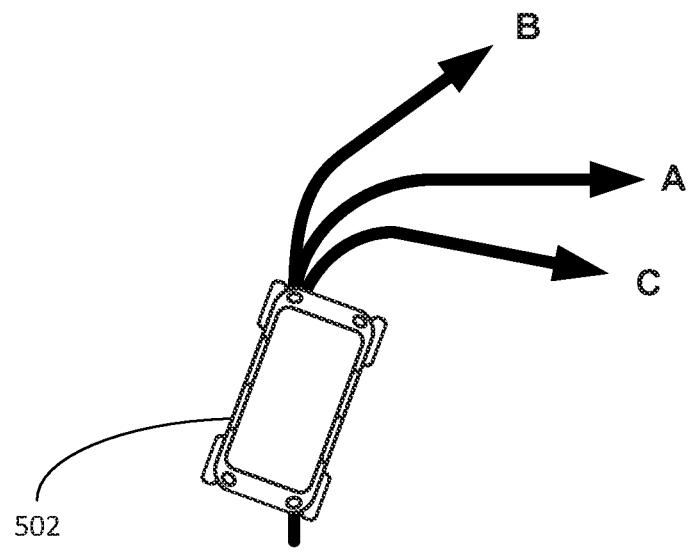
FIG. 5A is a schematic diagram illustrating example electronic stability control for a conventional (non-autonomous) vehicle.
Figure 5B:
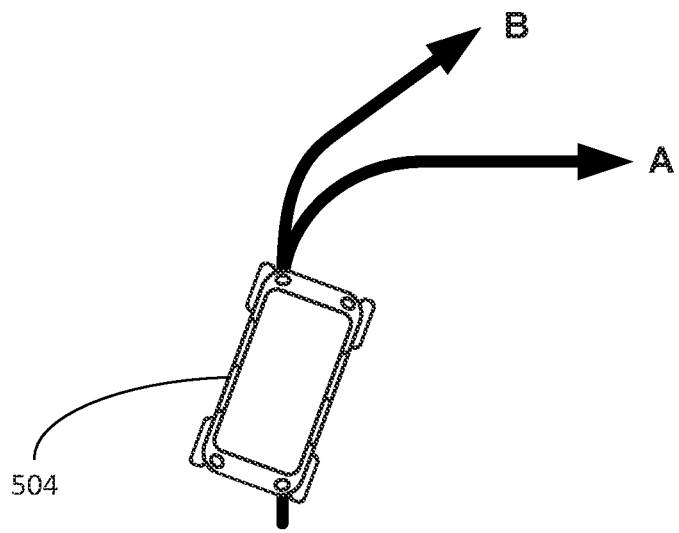
FIG. 5B is a schematic diagram illustrating example electronic stability control for an autonomous vehicle in accordance with some examples of the present disclosure.

FIGS. 5A and 5B compare benefits of separating ABS and ESC, particularly in an autonomous vehicle. As shown in FIG. 5A, conventional ESC systems for manually operated vehicles 502 use steering angle as an input, not an output. In other words, ESC uses an accelerometer, for example, to detect vehicle yaw to determine that there is a mismatch between the steering angle and the vehicle's yaw rate, which indicates some loss of control. Steering angle, however, is only marginally useful as an indication of where the driver wants the vehicle to go. Conventional ESC would assume, for example, that the user wants the vehicle 502 to turn more sharply than the current trajectory in response to an increase in steering angle. Unfortunately, a more experienced driver might tend to counter steer (dial in less steering angle) in an attempt to recover the slide, while a less experience driver would dial in more steering angle because the vehicle 502 is not turning as expected. In this manner, using steering angle as an input can provide erroneous results.

Thus, conventional ESC is somewhat hampered not only by sometimes inconsistent inputs, but also by not being able to use steering as an output to regain stability (e.g., counter steering to recover a slide). In FIG. 5A, the vehicle 502 is shown "oversteering," or sliding, along a path, B, where path B has a larger radius than the intended path, A, with the rear of the vehicle 502 outside the line of the intended path, A. The ESC then uses steering angle as an input to predict the intended path, A. Because the vehicle is oversteering during a right turn (and consequently not turning as much to the right as desired), the driver may tend to dial in even more steering angle to the right, causing the ESC to predict that the desired path is path C. This means that the sole input for the ESC to try to determine the desired path is an exaggerated one, path C.

In contrast, autonomous vehicles 504 do not have drivers, and may not have steering wheels, but rather navigate using maps and sensors to follow a planned path, A. As shown in FIG. 5B, the autonomous vehicle 504 does not have to try to predict the planned path, or expected trajectory, based on the steering angle. Instead, the autonomous vehicle 504 already knows the expected trajectory based on map data as well as an expected orientation, position, and/or pose (i.e. position and orientation) of the vehicle 108 based on the expected trajectory. Such a trajectory may be calculated in advance in accordance with a receding horizon technique in which a particular trajectory is indicative of a window of time into the future (e.g., less than 10 seconds). In some examples, a plurality of trajectories are calculated substantially simultaneously incorporating vehicle data and sensor data wherein a one trajectory of the plurality is selected which can best navigate an environment over the receding horizon. Such sensor data may be indicative of vehicle state (position and/or orientation, speed, etc.), as well as environmental sensor data (e.g. positions and/or orientations of objects in an environment).

Thus, the autonomous vehicle 504 simply compares sensor data to the expected data (e.g., the actual trajectory to the expected trajectory) to determine when the vehicle 108 has deviated from the expected result. The autonomous vehicle 504 can then make corrections, as necessary, based on the difference between the desired path, A, and the current path, B—including differential braking, differential power, and/or changing the steering angle—and/or based on differences in the expected pose or orientation of the vehicle 108, among other things. Thus, if the expected trajectory includes a right turn at a particular speed, the autonomous vehicle 504 can compare the current trajectory to the expected trajectory, the expected pose (e.g., vehicle 108 leaning slightly to the left), and the current position of the vehicle 108 to the expected position in 2D or 3D space to detect, and correct for, inconsistencies.

In this manner, steering angle becomes an output for the ESC, not an input. Instead of using only differential braking, therefore, the autonomous vehicle 504 can also counter steer and apply differential power, among other things. Additionally, the ESC is not hampered by erroneous steering angles from drivers that may be panicking to try to avoid an accident.

Figure 6A:
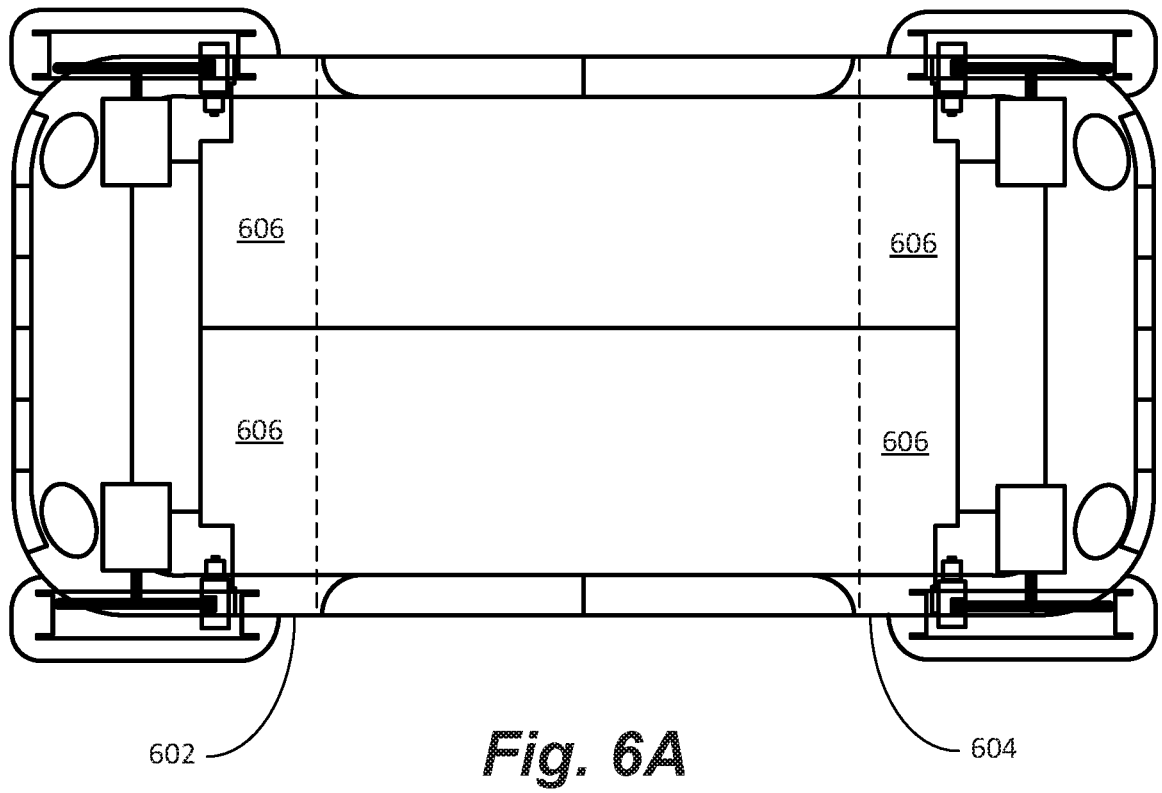
FIG. 6A depicts an example of a vehicle with two interchangeable drive modules, in accordance with some examples of the present disclosure.

As mentioned above, the electronic braking system 100 can also ease the implementation of interchangeable drive modules on the vehicle 108. As shown in FIG. 6A, in some examples the vehicle 108 can include a pair of interchangeable drive modules 602. In this manner, each end 126, 132 of the vehicle 108 can include an interchangeable drive module 602 that can be removed and replaced with a like part. In some examples, the "front" and "rear" interchangeable drive modules 602 can be identical to further reduce costs.

This configuration reduces vehicle downtime and maintenance costs. Vehicle downtime is minimized because, regardless of the extent of any repairs needed on the interchangeable drive modules 602, the vehicle 108 is only down for the time it requires to swap out the interchangeable drive modules 602. In addition, because the interchangeable drive modules 602 can be removed from the vehicle 108 for service and repair, access to components is improved, reducing maintenance time, difficulty, and cost. This configuration is described in detail in U.S. patent application Ser. No. 15/674,688, filed Aug. 11, 2017, entitled, "Vehicle with Interchangeable Drive Modules," which is hereby incorporated by reference.

Figure 6B:
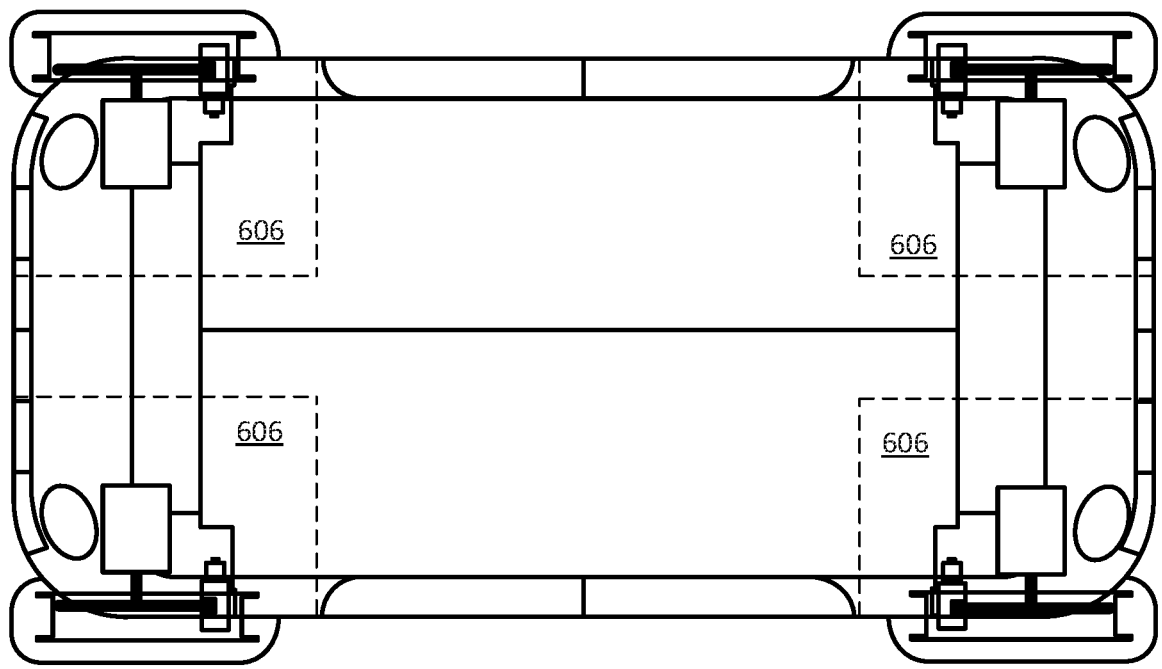
FIG. 6B depicts an example of a vehicle with four interchangeable drive modules, in accordance with some examples of the present disclosure.

As shown in FIG. 6B, in some examples, this modularity can be taken one step further with four interchangeable drive modules 606 disposed at each corner of the vehicle 108. In this configuration, each corner of the vehicle 108 can include an interchangeable, symmetric drive module 606 that can be installed at one of the four corners of the vehicle 108. This configuration is described in detail in U.S. Pat. No. 9,494,940, filed Nov. 14, 2015, entitled, "Quadrant Configuration of Robotic Vehicles," which is hereby incorporated by reference.

Regardless of the configuration used, the use of the electronic braking system 100 reduces the complexity and variability of exchanging components on the vehicle 108. In other words, because there are no hydraulic lines going to hydraulic brakes at each wheel 106, there is no need to disconnect, reconnect, and bleed hydraulic systems when changing out the interchangeable drive modules 602, 604. Indeed, each interchangeable drive module 602, 604 can be disconnected using standard electrical plugs (e.g., Weather Pack or Deutsch connectors) obviating the need to contain messy and caustic brake fluid and to bleed brakes, which can provide somewhat inconsistent results. Even in the configuration that uses hydraulic actuators 112, the hydraulic lines (if any) can be isolated to a particular wheel 106 with no central master cylinder or ABS unit required.

Figure 7A:
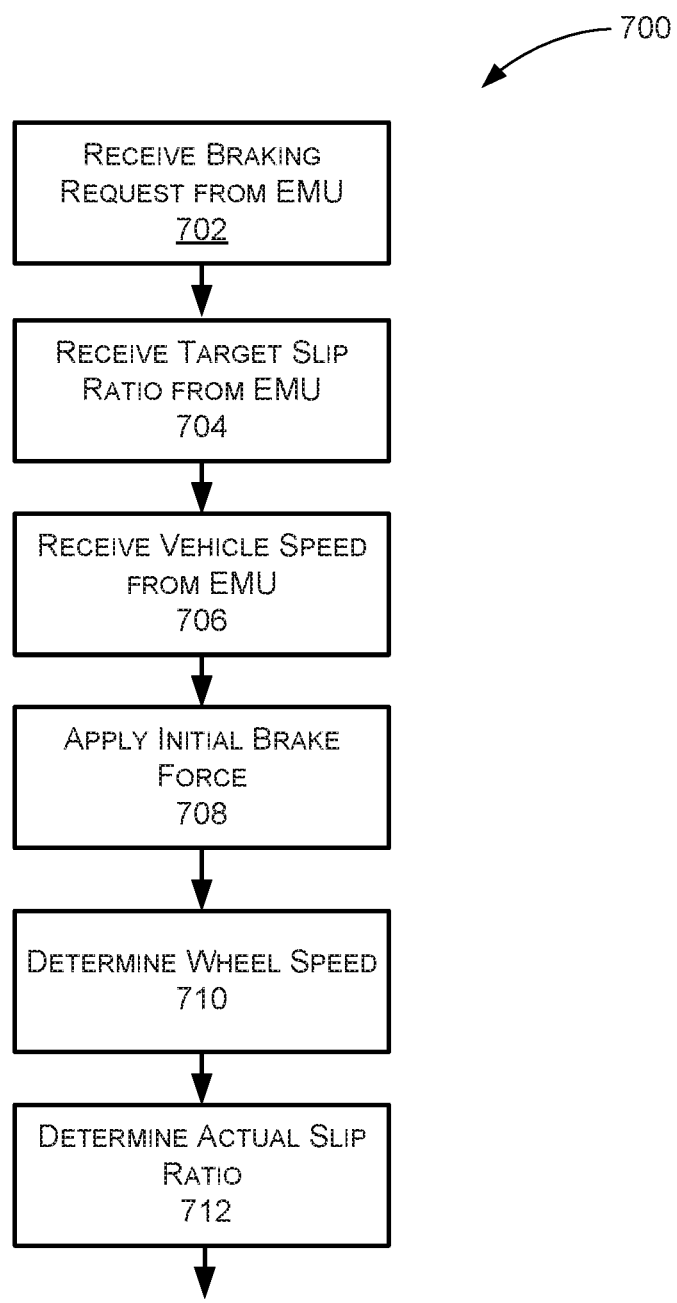
FIGS. 7A and 7B depict a method of using an electronic braking system for independent antilock braking at each wheel, in accordance with some examples of the present disclosure.
Figure 7B:
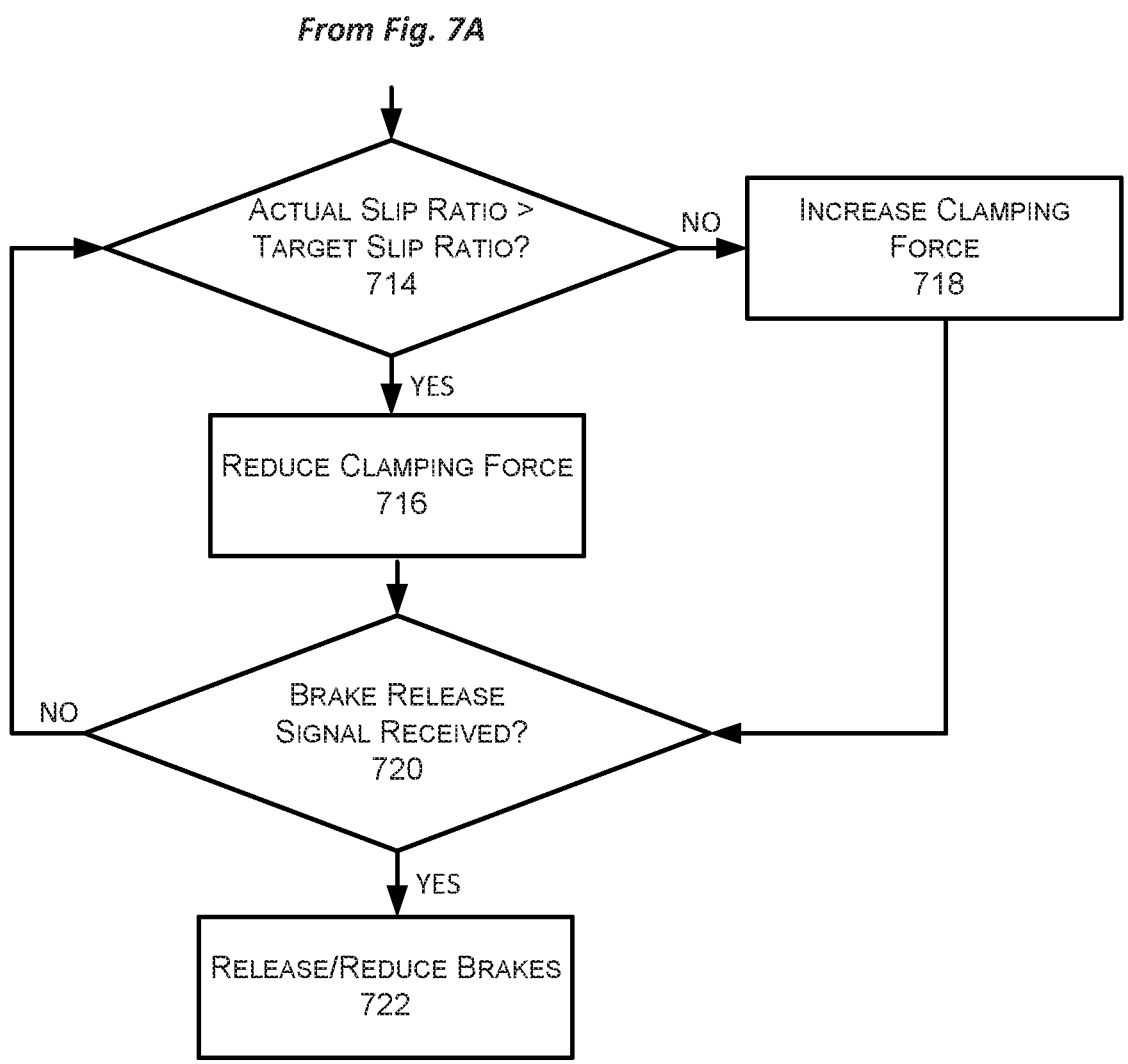

As shown in FIGS. 7A, 7B, and 8, and mentioned above, separating ABS and ESC functions can have several benefits. As shown in FIGS. 7A and 7B, the electronic brake caliper assembly 104 enables each wheel to be independently controlled for slip without the need for a centralized master cylinder, ABD pump, hydraulic lines, accumulators, and other components. As shown in FIG. 8, separating ESC from ABS, particularly in an autonomous vehicle, enables steering angle to be used as an output to speed recovery of vehicle stability and reduce deviation from the desired path.

FIGS. 7A and 7B are a flowchart illustrating an example method 700 of controlling wheel slip at each wheel independently. As mentioned above, ABS functions are generally only triggered in maximum braking situations. This may be to avoid another vehicle, pedestrian, or other object, but should be the exception rather than the rule. To that end, at 702, the method 700 starts when the CECU 114 receives a request from the EMU 116. The request can include, for example, for a particular brake torque, deceleration rate, or slip ratio, among other things.

At 704, the CECU 114 can receive the target slip ratio from the EMU 116. This can be based on current road, weather, and vehicle conditions, among other things. So, for example, the target slip ratio may be lower when it is raining than when it is dry. In some examples, the CECU 114 can receive this information from the EMU 116 periodically, as conditions change and the target slip ratio is updated. In other examples, the CECU 114 may request the target slip ratio at a particular braking threshold, brake pressure, or in response to a message from the EMU 116, or another component, indicating an imminent emergency braking event. In still other examples, the request for maximum brake torque from the EMU 116 can include the target slip ratio.

At 706, the CECU 114 can receive the current vehicle speed from the EMU 116. In some examples, the vehicle speed can be provided as the actual speed of translation of the vehicle 108 (e.g., in m/s), which is easily converted to an angular velocity for the wheel using the circumference, radius, or diameter of the tire 124. In other examples, the vehicle speed can be converted by the EMU 116 to angular velocity and provided to the CECU 114. Regardless, the vehicle speed can enable the CECU 114 to compare the current wheel speed to the calculated wheel speed during pure rolling at the given vehicle speed. In other words, if the wheel speed (the angular velocity of the wheel) and the vehicle speed are the same, the wheel 106 (or tire 124) is not slipping, and vice versa.

At 708, the CECU 114 sends a signal to the brake actuator 112 to apply a first, preset force to the brake pads in the caliper 110 to generate a braking torque in the brake rotor 102. The first force can be an estimate based on the target slip ratio, for example, or the estimated friction of the surface, as discussed above. The first force is intended to generate maximum braking torque as quickly as possible, which can then be adjusted based on feedback related to the resultant slip ratio.

At 710, the CECU 114 can determine the current wheel speed. This can be done, for example, using a tone ring with a magnetic or optical sensor, motor encoders, rotary speed sensors, or other methods known in the art. The wheel speed is generally provided as a frequency, or pulses per second, which can then be associated with a particular angular velocity for the wheel 106. Conveniently, in this configuration, each CECU 114 is only concerned with the wheel 106 to which it is mounted and can control wheel speed independently of the other wheels 106.

At 712, the CECU 114 can compare the actual wheel speed to the vehicle speed provided by the EMU 116 to determine the current slip ratio. As mentioned above, the slip ratio can be negative (wheel spin), 0 (pure rolling), a positive fraction (some wheel slip), or 1 (wheel locked). Of course, in a braking scenario, the slip ratio will not be negative. Thus, the slip ratio will be somewhere between 0 and 1. In dry conditions and at moderate speeds (e.g., 5-60 MPH), for example, a slip ratio of approximately 0.15 (wheel turning 15% slower than actual vehicle speed) can produce minimum stopping distances. At very low speeds (e.g., below 5 MPH) on dry pavement, on the other hand, a slip ratio of approximately 0.2 can produce minimum stopping distances.

FIG. 7B is a continuation of method 700 and illustrates, at 714, the CECU 114 can determine if the current slip ratio is higher or lower than the target slip ratio. At 716, if the current slip ratio is higher than the target slip ratio, then the CECU 114 can send a signal to the brake actuator 112 to reduce the force being applied to the brake pads. Conversely, at 718, if the current slip ratio is lower than the target slip ratio, then the CECU 114 can send a signal to the brake actuator 112 to increase the force being applied to the brake pads. Depending on the type of brake actuator 112, this can be done by simply rotating a servo motor, for example, repositioning a linear actuator, or changing the hydraulic pressure on the electronic brake caliper assembly 104.

As discussed below with respect to FIGS. 9A and 9B, it is worth noting that, because the brake actuator 112 can provide fine control over the pressure applied to the brake pads, the CECU 114 can provide analog anti-lock control. Thus, rather than bouncing above and below the desired slip ratio, the electronic braking system 100 can quickly and smoothly converge on, and then maintain, the desired slip ratio. This provides a smoother, less jarring experience for passengers, reduces stopping distances, and caused less wear and tear, among other things.

At 720, the CECU 114 can determine if a brake release signal has been received from the EMU 116. In other words, in some examples, the EMU 116 may command the vehicle 108 to come to a complete stop as quickly as possible. In other situations, the EMU 116 may initially detect an obstacle that then clears the path of the vehicle 108, such as another vehicle crossing in front of the vehicle 108. In this case, it may nonetheless necessary to apply maximum braking to avoid a collision but, once the other vehicle has cleared the path of the vehicle 108, the brakes can be released, and the vehicle 108 can continue along its path. In some examples, due to changing conditions, the vehicle 108 may also be able to transition to regenerative braking and partially, or completely, release the electronic brake caliper assemblies 104.

To this end, at 722, if the EMU 116 sends the signal to the CECU 114 to release the electronic brake caliper assembly 104, the CECU 114 can send a signal to the brake actuator 112 to release the pressure on the brake pad. In some examples, the brake actuator 112 can move to a "park" position, in which the brakes are partially, or fully, released. Depending on conditions, the park position may maintain a slight pressure on the pads to reduce braking distances. This can be useful in wet conditions, for example, as the pad can be used to wipe the water off the brake rotor 102 during normal driving conditions to provide better response when the brakes are applied. In other words, the brake rotor 102 will already be substantially dry when the brakes are applied reducing stopping distances. In the case of ferrous brake rotors 102, this procedure may also be useful to wipe the rust off of the brake rotor 102 that can form overnight, for example, or in wet conditions.

At 720, if, on the other hand, no release signal is received at the CECU 114, the process can repeat iteratively until either the vehicle speed is zero, or the release signal is received. To that end, at 706, the CECU 114 can receive an updated vehicle speed and continue to control wheel speed for that particular wheel 106. Of course, using modern microprocessors, this process can be repeated thousands of times a second, providing accurate closed-loop braking at, or near, the target slip ratio until the CECU 114 is commanded to release the caliper 110.

Of course, ABS is generally relevant only at the limits of traction. In a vast majority of cases, the autonomous vehicle 108 will be using regenerative braking to gradually come to a stop with very little required of the electronic braking system 100. Indeed, in normal operation (i.e., other than emergency braking), the electronic braking system 100 may only be used to bring the vehicle to a complete stop (e.g., "the last 3 MPH") and to provide hill holding and parking brake functions. During emergency braking, however, the electronic braking system 100 can quickly apply maximum braking torque until the target slip ratio is achieved to minimize braking distances.

FIG. 8 is a flowchart illustrating an example method 800 in which ESC function is separated from ABS. In the case of an autonomous vehicle such as autonomous vehicle 108, the desired trajectory is known. It can be represented as a trajectory along a 3D map, that is related in some way to driving down a street, for example, and then turning right on a cross-street. The vehicle 108 then receives data from the sensor array(s) 134, compares the sensor data to the map data, and corrects the trajectory of the vehicle.

In addition, the vehicle dynamics are known under normal circumstances. In other words, turning the front wheels at a particular speed and on a particular surface, for example, should produce a known lateral acceleration and yaw rate. In general, when the vehicle is in pure rolling motion and not sliding, or otherwise out of control, known inputs should produce known vehicle motions, with only slight deviations and with only slight corrections needed to maintain the desired path.

As above, in an autonomous vehicle for instance, precise trajectories may be calculated at a given frequency to maneuver the vehicle 108 safely through an environment. Such a trajectory may correspond to a series of vehicle poses (i.e. position and orientation), linear and angular velocities, as well as linear and angular accelerations. In turn, such trajectories may be translated (via, for example, a low-level controller) to vehicle steering angles and torque and/or braking applied to vehicle wheels. To a large extent, therefore, since values for steering, braking, torques, and velocity that should put the vehicle 108 on the desired trajectory are known, deviations from the desired trajectory, may indicate that there is some loss of control. Of course, deviations from the desired trajectory may only be significant above some threshold to distinguish between a loss of control from normal, minor deviations, for example, that require only small steering angle corrections. Thus, a loss of control can be detected when a deviation from the desired trajectory exceeds a predetermined threshold, in addition to conventional methods (e.g., yaw inconsistent with steering angle, sudden increase or decrease in lateral acceleration, etc.)

At 802, therefore, the EMU 116 can receive current sensor data from the sensor array(s) 134 and other sensors. As mentioned above, this can include, for example, a variety of data from imagers (e.g. RGB cameras, RGB-D cameras, greyscale cameras, etc.), LIDAR, RADAR, GPS, IMU, and other sensors to localize the vehicle 108 (i.e. provide a position and/or orientation) relative to a map. This can also include inputs from, for example, gyroscopes, magnetometers, accelerometers and/or inertial measurement units (IMUs) to provide linear acceleration and angular velocities. Yaw rate can be compared to commanded steering angle, for example, to detect over- or understeer. In addition, deviations from an expected trajectory may then be measured from a measured position and/or orientation when localizing.

At 804, the EMU 116 can compare the sensor data to expected data to determine if the vehicle 108 is "on course," or if there is some significant deviation. As mentioned above, the vehicle's onboard navigation systems (discussed below) can account for minor deviations from the desired trajectory. These can be minor corrections to account for road crown, uneven surfaces, and other normal factors that are corrected for almost unconsciously by human drivers. When the deviations reach a predetermined threshold, however, it may be necessary for the EMU 116 to take corrective action.

The comparison can include using external sensor data from the sensor array 134 to localize the vehicle 108 to the map. The comparison can also include comparing a yaw rate, for example, to the commanded steering angle. In other words, when the vehicle is turning, the known vehicle dynamics can be used to compare the current yaw and steering angle to determine if the vehicle is spinning (oversteer), pushing (understeer), or otherwise not completely under control.

At 806, based on the comparison between the sensor data, map data, yaw rates, lateral acceleration the EMU 116 can determine if the vehicle 108 is on the desired trajectory. If a comparison of the position and/or orientation recovered from localization and that of the desired (or expected) trajectory indicates a deviation beyond a threshold, for example, the EMU 116 can determine that the vehicle 108 has deviated from the desired trajectory. This comparison can include the comparison of multiple sensors (e.g., RADAR, LIDAR, and imagers) to a variety of maps for redundancy and accuracy.

At 808, if there is a significant deviation (i.e., more than a minor correction is required), the EMU 116 already has the data it needs to take action. Significantly, in the configuration, the EMU 116 can now use steering angle as an output to effect correction back to the desired path. Thus, if the vehicle 108 is oversteering, for example, the EMU 116 can send a signal to the CECU 114 for the outer front wheel to apply the brakes, counter steer (i.e., reduce the commanded steering angle), and/or increase the power to the inner rear wheel (e.g., for vehicles 108 with independent motors at each corner or torque biasing differentials).

FIGS. 7A, 7B, and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects of interest, components, data structures, and the like that perform particular functions or implement particular abstract data types. The order in which the operations are described is not intended to be construed as a limitation, and any number of the described blocks can be combined in any order and/or in parallel to implement the processes.

Figure 9A:
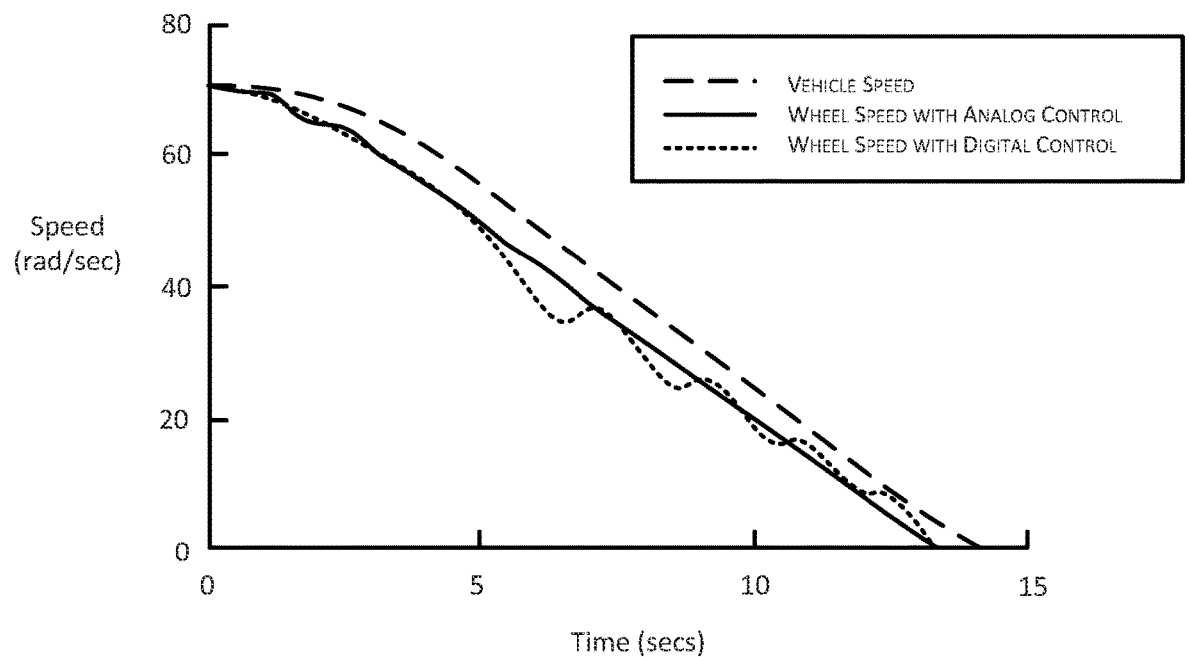
FIGS. 9A and 9B are graphs illustrating a comparison of digital to analog control for wheel speed (FIG. 9A) and slip ratio (FIG. 9B), in accordance with some examples of the present disclosure.
Figure 9B:
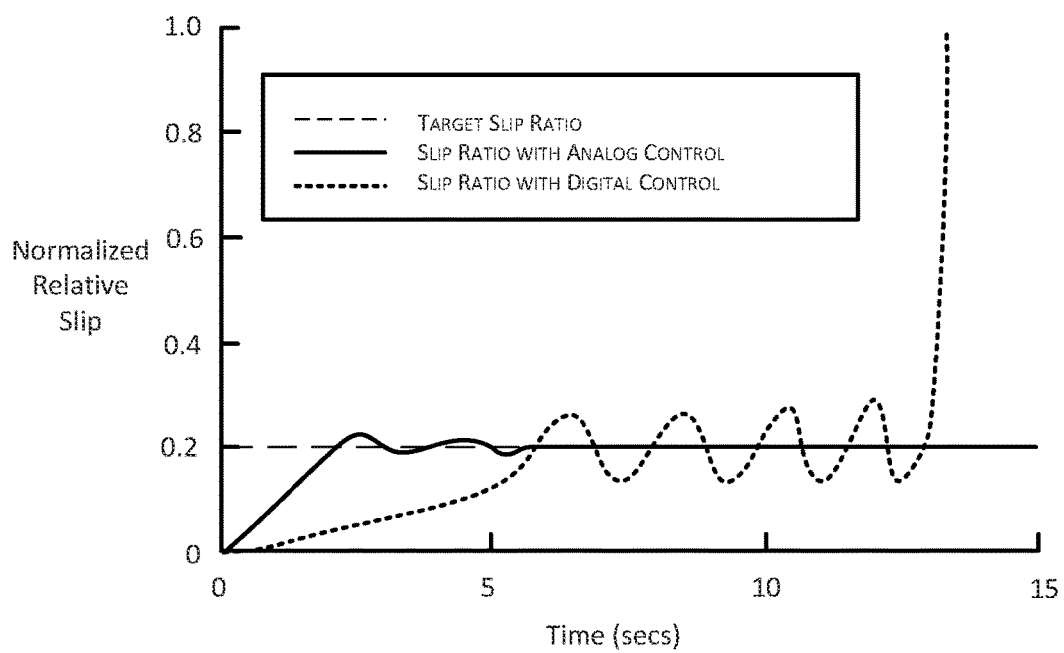

As shown in FIGS. 9A and 9B and mentioned above, the electronic braking system 100 also enables braking forces to be modulated in an analog manner to provide reduced stopping distances and reduced noise, vibration, and harshness (NVH) during emergency braking maneuvers. FIG. 9A compares vehicle speed (dashed line) to analog (solid line) and digital (dotted line) ABS results. As shown, due to the on-off nature of digital controls and the limitations of centralized hydraulic ABS systems, the wheel speed of the digital ABS system varies up and down several times during the braking event when compared to the vehicle speed. In addition, the wheel speed is essentially never at the speed dictated by the commanded slip ratio, but rather constantly above or below it. In contrast, the analog response of the electronic braking system 100 quickly settles to the desired wheel speed relative to vehicle speed and maintains this relationship throughout the braking event.

Similarly, FIG. 9B compares the slip ratio for the analog (solid line) and digital (dotted line) ABS. As one would expect from a digital system, the on-off-on action of the antilock solenoids in the digital ABS approximate the desired slip ratio by alternately applying and releasing the brakes. Thus, the actual slip ratio varies up and down, above and below the commanded slip ratio (in this case 0.2). The analog response of the electronic braking system 100 on the other hand quickly settles to provide the commanded slip ratio for the majority of the braking event. Indeed, the response shown, while excellent, is typical of a very simple proportional-integral-derivative (PID) controller. This performance can be further refined with more sophisticated control logic.

Figure 10:
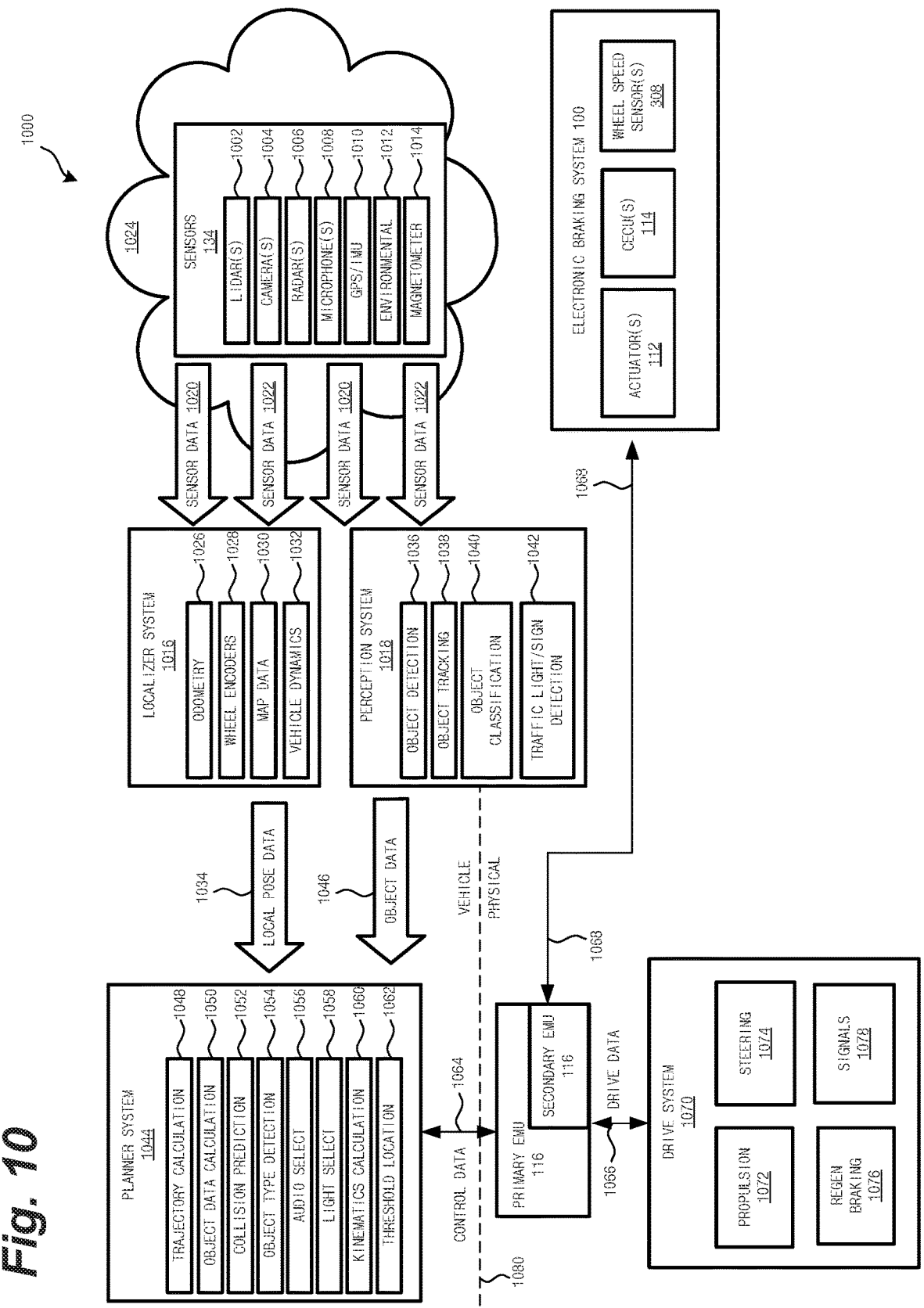
FIG. 10 is a component level view of an example operation control system, in accordance with some examples of the present disclosure.

FIG. 10 is a block diagram of an illustrative operation control system 1000 configured to control operations of the vehicle 108 including the CECU 114, EMU 116, and sensor array 134, among other things. In various implementations, the operation control system 1000 may be implemented using a uniprocessor system including one processor, or a multiprocessor system including several processors (e.g., two, four, eight, or another suitable number). In some implementations, the processor(s) can comprise a central processing unit (CPU), a graphics processing unit (GPU), or both a CPU and a GPU, or any other sort of processing unit. The processor(s) may be any suitable processor capable of executing instructions. For example, in various implementations, the processor(s) may be general-purpose or embedded processors implementing any of a variety of instruction set architectures (ISAs), such as the x86, Performance Optimization with Enhanced RISC—Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 1000 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic random access memory (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 1000 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 10, and mentioned above, the operation control system 1000 includes the one or more sensors in one or more sensor arrays 134 including a plurality of sensors 1002-1014. The sensor array 134 can include, for example, LIDAR 1002, image capture sensors 1004 (e.g., cameras or other imagers), RADAR 1006, sound capture sensors 1008 (e.g., microphones and/or ultrasonic sensors such as sound navigation and ranging (SONAR), GPS sensors, and/or inertial measurement unit sensors (IMU) 1010. The IMU 1010 can include, for example, one or more gyroscopes and/or accelerometers to measure the orientation and/or acceleration of the vehicle 108. As discussed above, yaw rate information can be provided to the EMU 116, for example, to detect a loss of control and provide ESC functions.

The sensor array 134 may also include one or more environmental sensors 1012, such as, for example, one or more sensors for detecting ambient temperature, temperature of the road surface, humidity, and barometric pressure. As discussed above, this information may be used by the EMU 116, for example, to calculate the current slip ratio. The sensor array 134 can also include one or more magnetometers (e.g., electronic compasses) 1014.

The operation control system 1000 may also include a localizer system 1016 and a perception system 1018, each of which may receive location and environment sensor data 1020 and/or object sensor data 1022 from one or more of the sensor arrays 134. For example, the localizer system 1016 may receive location and environment sensor data 1020 associated with the position and/or orientation (collectively, the pose) of the vehicle 108 in the environment 1024. Thus, the localizer system 1016 can use substantially all of the vehicle sensor data 1020,1022 (e.g., LIDAR(s) 1002, camera(s) 1004, RADAR(s) 1006, microphone(s) 1008, GPS/IMU 1010, etc.) to determine the vehicle pose. The perception system 1018 may receive object sensor data 1022 relevant to determine information associated with objects of interest in the environment 1024 proximate the vehicle 108, such as sensor data from LIDAR 1002, image capture sensors 1004, RADAR 1006, environmental sensors 1012, and/or sound capture sensors 1008. In some examples, the localizer system 1016 may also receive data from sources other than the sensor array 134, such as, for example, map data, map tile data, route data, route network definition file (RNDF) data, a data store, and/or a data repository.

In some examples, the location and environment sensor data 1020 received by the localizer system 1016 may be identical (or at least similar to) the object sensor data 1022 received by the perception system 1018. In some examples, the sensor data 1020, 1022 received by the localizer system 1016 may not be identical to the sensor data 1020, 1022 received by the perception system 1018. The sensor data 1020, 1022 may each include data from any combination of one or more of the sensor arrays 134 or individual sensors 1002-1014s. The amounts and types of sensor data 1020, 1022 may be independent from one another and/or may be similar or equivalent.

The localizer system 1016 may receive and/or access data from sources other than sensor data 1020, 1022, such as, for example, odometer data 1026 (e.g., from motion sensors configured to estimate a change in position of the vehicle 108 over time), wheel encoders 1028 configured to calculate motion, distance, and other metrics associated with the vehicle 108 based on the rotations of one or more of the wheels 106, map data 1030 from data representing map tiles, route data, RNDF data, and/or other data, and data representing the model and/or type of vehicle corresponding to the vehicle 108, which may be used to calculate vehicle location data based on vehicle dynamics modeling 1032 (e.g., from simulations, captured data, etc.) of the vehicle 108.

The localizer system 1016 may use one or more of the data resources indicated herein to generate data representing a position and/or orientation relative to a local map (e.g., local pose data 1034), and current vehicle dynamics, including identifying, for example, mismatches between the steering angle and yaw rate, as discussed above. Indeed, the system 100 includes full six degrees of freedom (6DOF) measurement (localizer system 1016), with associated derivatives (e.g., velocity and acceleration) and full 6DOF vehicle dynamics (planner system 1044, discussed below) with associated derivatives. This can enable the localizer system 1016 to measure current vehicle 108 pose and/or orientation for comparison to expected vehicle pose and/or orientation by the planner system 1044. Thus, when executing a right turn at a particular steering angle and at a particular speed, the system 1000 may expect a certain yaw rate (turning), lean angle (vehicle leaning to the outside of the turn), etc., which can be compared to the measured vehicle dynamics to determine when a loss of control has occurred, or is imminent.

In some examples, the perception system 1018 may analyze, process, and/or manipulate sensor data 1020, 1022 to implement object of interest detection 1036 and/or an object of interest tracking 1038. This can include differentiating between objects of interest that are static and objects of interest that are in motion (i.e. dynamic). The object of interest tracking 1038 can also track one or more moving objects of interest based on the movement of the object of interest in the environment 1024. This can also include an object of interest classification 1040 to identify the object of interest type—e.g., car, motorcycle, cyclist, pedestrian, empty box, trash, etc. The perception system 1018 can also include a traffic light/sign detection 1042 strategy (e.g., identifying traffic lights, stop signs, railroad crossings, lane markers, and pedestrian crosswalks). As mentioned above, the EMU 116 may receive data from the perception system 1018, or may receive data directly from the sensor array(s) 134 for separate analysis—i.e., the needs of the EMU 116 may be the same as, or different than, the needs of the planner system 1044 and other vehicle components.

In the example shown, the operation control system 1000 also includes a planner system 1044 configured to receive the local pose data 1034 and object of interest data 1046, and analyze the local pose data 1034 and the object of interest data 1046 to implement functions including, for example, a trajectory calculation 1048, an object of interest data calculation 1050, a collision prediction 1052, an object of interest type detection 1054, an audio signal selection 1056, a light pattern selection 1058, a kinematics calculation 1060, and a threshold location estimation 1062. The example planner system 1044 may communicate trajectory and control data 1064 to the EMU 116, for example, to determine when the electronic brake caliper assemblies 104 should be utilized (e.g., as opposed to using regenerative braking).

Indeed, as mentioned above, the planner system 1044 can include full 6DOF vehicle models, with associated derivatives (e.g., velocity and acceleration) to provide expected pose and/or orientation of the vehicle 108 based on the current steering angle, speed, traction conditions, and other factors. The EMU 116, in turn, can compare the measured data from the localizer system 1016 to the expected vehicle dynamics from the planner system 1044 to determine whether the vehicle 108 is on the expected trajectory or not. If not, the system 1000 can implement separate ABS and ESC functions, as necessary to return to the expected directory. Thus, the EMU 116 can employ ABS (controlled by the CECUs 114), differential braking, differential power, and/or steering inputs to recover the vehicle 108.

The EMU 116 may be configured to process the control data 1064 to generate and/or receive drive system data 1066 and brake system data 1068 from the electronic braking system 100. The drive system data 1066 may be communicated to a drive system 1070, and the drive system 1070 may be configured to communicate the drive system data 1066 to a propulsion system 1072, a steering system 1074, a regenerative braking system 1076, and a signal system 1078 (e.g., turn signals, brake signals, headlights, and/or running lights). For example, the drive system data 1066 may include propulsion data (e.g., a voltage, current, or power signal for electric motors, and/or a throttle signal for internal combustion engines) for the propulsion system 1072, steering angle data for the steering system 1074 (e.g., a commanded steering angle and a current steering angel from a steering angle sensor) and regenerative braking data for the regenerative braking system 1076 (e.g., as opposed to the electronic braking system, 100).

As mentioned above, the EMU 116 may receive data from the planner system 1044 regarding, for example, the local pose data 1034, object of interest data 1046, trajectory calculation 1048, and object of interest type detection 1054 to determine when there is a loss of control of the vehicle 108, for example, or to decide whether regenerative braking system 1076 is sufficient or if the electronic braking system 100 should be used. As mentioned above, regenerative braking system 1076 can be used in a vast majority of situations, with the electronic braking system 100 used only during panic braking, for example, and some specialized applications (e.g., parking brake and hill holding).

In some examples, as mentioned above, the EMU 116 may also compare the current pose and/or orientation of the vehicle 108 provided by the localizer system 1016 and an expected pose and/or orientation provided by the planner system 1044 to determine when the vehicle is off course. If the actual pose of the vehicle 108 does not match the expected pose, the EMU 116 can determine whether a minor correction is warranted or if ESC functions are needed. The localizer system 1016 and planner system 1044 may be used in conjunction with the IMU 1010 and steering system 1074 data, for example, to detect that the vehicle 108 is both off course and that the measured yaw rate does not match the expected yaw rate (or any other vehicle dynamics), for example, based on the current steering angle. The EMU 116 can then provide differential braking with the electronic braking system 100, differential power with the propulsion system 1072, and/or change the steering angle with the steering system 1074 to regain control and put the vehicle 108 back on course.

In the example shown in FIG. 10, a dashed line 1080 represents a demarcation between a vehicle trajectory processing layer and a vehicle physical execution layer, where data processed in the vehicle trajectory processing layer is implemented by one or more of the EMU 116, drive system 1070, and/or electronic braking system 100.

As mentioned above, in some examples, the vehicle 108 can also include one or more EMUs, such as EMU 116. The EMU 116 can manage overall vehicle motion and perform navigation, ESC, and other executive functions. The electronic braking system 100, on the other hand, can handle ABS functions independently of the EMU 116 and at each wheel 106. In other words, each electronic brake caliper assembly 104 is responsible only for the wheel 106 on which it is mounted. When commanded to by the EMU 116, each electronic brake caliper assembly 104 applies braking force sufficient to generate the commanded slip ratio until commanded to release. And, while the electronic brake caliper assemblies 104 are also available to provide differential braking for ESC functions, for example, ESC functions are handled solely by the EMU 116. The benefits of separating ABS and ESC function are discussed in detail above.

Figure 11:
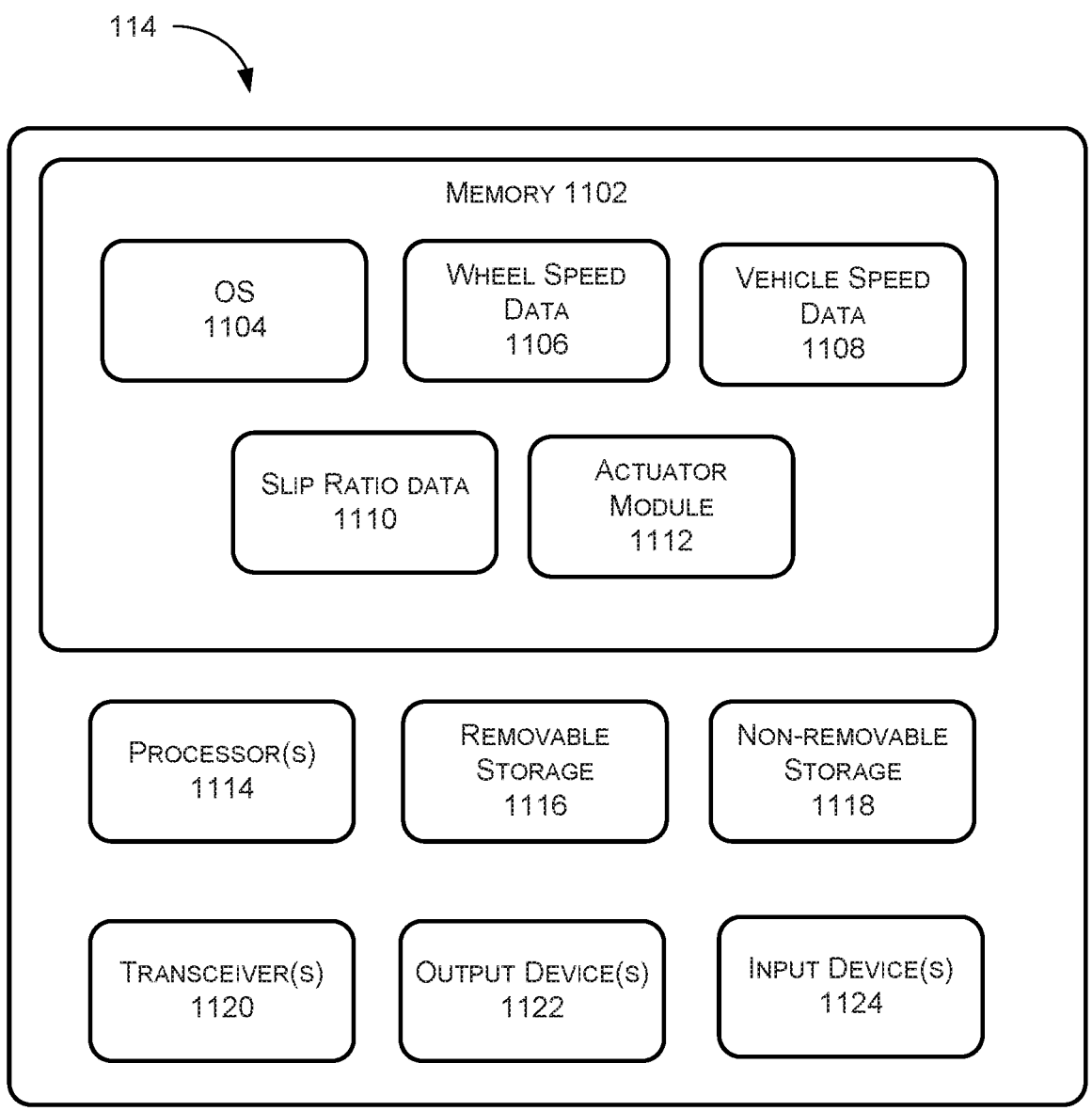
FIG. 11 is a component level view of an example electronic device, such as a caliper electronic control unit (CECU), in accordance with some examples of the present disclosure.

FIG. 11 is a component level schematic view an example of an electronic device. For ease of explanation, the electronic device is described in terms of the functions of the CECU 114. One of skill in the art will recognize, however, that the electronic device could be used for many other functions in the vehicle 108 with minor modification. Indeed, a similar electronic device can comprise a component of the operation control system 1000 or other electronic components for use with the electronic braking system 100 and methods 700, 800 described herein.

In some examples, the CECU 114 can comprise a dedicated electronic device, such as a dedicated microcontroller. Other components of the electronic braking system 100, however, could comprise an electronic device with multiple functions such as, for example, a cell phone, smart phone, laptop, tablet, or another electronic device that comprise a number of components to gather data, communicate, provide ESC, and maneuver, among other things.

The CECU 114 can comprise memory 1102 configured to include computer-executable instructions including at least an operating system (OS) 1104 for receiving data and controlling the electronic brake caliper assembly 104, among other things. The memory 1102 can also include the ability to receive and store incoming wheel speed data 1106, vehicle speed data 1108, and slip ratio data 1110. The CECU 114 can also comprise an actuator module 1112 to control the brake actuator 112 of the electronic brake caliper assembly 104. Depending on the type of brake actuator 112 used, the actuator module 1112 can comprise a driver for a linear actuator, for example. In the case of an electric motor 302, as discussed above, the actuator module 1112 can comprise the motor controllers 306*a*, 306*b*. The CECU 114 can also include one or more processors 1114, removable storage 1116, non-removable storage 1118, transceiver(s) 1120, output device(s) 1122, and input device(s) 1124. Of course, in some examples, rather than being stored in the CECU 114, the wheel speed data 1106, vehicle speed data 1108, slip ratio data 1110, and other functions, or portions thereof, can be located on another component, such as the EMU 116, and accessed by the CECU 114 via the communication network 120, for example.

In various implementations, the memory 1102 can be volatile (such as random access memory, or RAM), non-volatile (such as read only memory, or ROM, flash memory, etc.), or some combination of the two. The memory 1102 can also comprise the OS 1104. The OS 1104 can receive sensor data, make calculations (e.g., calculate the current slip ratio), and communicate with other components in the vehicle 108 (e.g., the EMU 116) related to the various systems of vehicle 108.

The memory 1102 can also store incoming wheel speed data 1106 from the wheel speed sensor 312. The memory 1102 can also store incoming vehicle speed data 1108, which can be provided by the EMU 116, and updated as necessary during electronic braking. In some examples, the EMU 116 may provide vehicle speed data 1108 multiple times per second. In other examples, the CECU 114 can access this information from outside sources via the communication network 120.

Similarly, the memory 1102 can also store the current slip ratio data 1110. The slip ratio data 1110 can be updated periodically by the EMU 116, for example, due to changing conditions. Thus, the slip ratio data 1110 may be updated multiple times per second, every couple of minutes, or even hours or days apart depending on conditions. In a consistently warm dry climate such as Arizona, for example, the slip ratio data 1110 may only be updated on the rare occasion that there is rain. In areas with more variable weather, or during a rainstorm, for example, the slip ratio data 1110 may be updated more frequently.

In some examples, the memory 1102 can also include the actuator module 1112. The actuator module 1112 can enable the CECU 114 to communicate with the brake actuator 112 and to directly, or indirectly, reposition the brake pads in the electronic brake caliper assembly 104 to achieve the desired clamping force. In some examples, the actuator module 1112 can activate directly, or via a relay or the motor controllers 306, solenoids, linear actuators, or motors that enable the brake pads to be moved in or out to increase or decrease, respectively, the clamping force on the brake rotor 102.

In some implementations, the processor(s) 1114 can comprise a central processing unit (CPU), a graphics processing unit (GPU), or both a CPU and a GPU, or any other sort of processing unit, including, but not limited to ASICs, FPGAs, microcontrollers and the like. The processor(s) 1114 can be responsible for running software on the CECU 114, including the OS 1104 and other modules, and to interpret and send messages to the central control, if applicable. In some examples, the processor(s) 1114 can also perform calculations and provide instructions based on the current slip ratio calculated from the wheel speed data 1106 and vehicle speed data 1108, among other things.

The CECU 114 can also include additional data storage devices (removable and/or non-removable) such as, for example, memory chips, magnetic disks, optical disks, or tape. Such additional storage is illustrated in FIG. 11 by removable storage 1116 and non-removable storage 1118. The removable storage 1116 and non-removable storage 1118 can store the various modules, programs, and algorithms for the OS 1104, slip control, and other modules.

Non-transitory computer-readable media may include volatile and nonvolatile, removable and non-removable tangible, physical media implemented in technology for storage of information, such as computer readable instructions, data structures, program modules, or other data. The memory 1102, removable storage 1116, and non-removable storage 1118 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the CECU 114. Any such non-transitory computer-readable media may be part of the CECU 114 or may be a separate device (e.g., a jump drive) or a separate database or databank (e.g. at a central server).

In some implementations, the transceiver(s) 1120 can include any sort of transceivers known in the art. The transceiver(s) 1120 can include, for example, wireless modem(s) to facilitate wireless connectivity with the EMU 116, for example, other vehicle components, the Internet, and/or an intranet. Further, the transceiver(s) 1120 may include a radio transceiver that performs the function of transmitting and receiving radio frequency communications via an antenna (e.g., cellular, Wi-Fi, or Bluetooth®).

In some implementations, the output device(s) 1122 can include any sort of output devices known in the art, such as the displays (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to the passenger. In some examples, the output device(s) 1122 can play various sounds related to whether the vehicle 108 is occupied or not, for example, or sounds intended to alert a passenger that the vehicle 108 is moving from one pose to another. Output device(s) 1122 can also include ports for one or more peripheral devices, such as headphones, peripheral speakers, or a peripheral display to provide feedback to passengers, for example.

In various implementations, input device(s) 1124 can include any sort of input devices known in the art. For example, input device(s) 1124 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 1124 can also include communication ports to receive data from passengers, external sensors, or cameras, among other things.

While several possible examples are disclosed above, examples of the present disclosure are not so limited. For instance, while systems and methods for implementing electric caliper braking for ABS and ESC control in autonomous vehicles are discussed, the system could also be used in semi-autonomous or manually operated vehicles without departing from the spirit of the disclosure. In addition, the location and configuration used for various features of examples of the present disclosure such as, for example, the order of steps, the components of the electronic braking system 100, or the CECU 114, and the locations of various components (e.g., the sensor array 134, drive motors 142, and other components) can be varied according to a particular vehicle 108, vehicle layout (e.g., sedan, sport utility vehicle (SUV), semi-truck, or otherwise), or other component that requires a slight variation due to, for example, the size or construction of the vehicle 108, the passenger compartment, the operating area 122 of the vehicle 108, or the processing power of, for example, the CECU 114 or EMU 116. Such changes are intended to be embraced within the scope of this disclosure.

The specific configurations and layouts of the electronic braking system 100, vehicle 108, CECU 114, EMU 116, and other features, and the size, location, and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of protection afforded by this application is indicated by the appended claims, rather than the foregoing description, and all variations that come within the meaning and range of equivalents thereof are intended to be embraced therein.

A. An electronic brake caliper assembly comprising an electronic brake caliper assembly, mounted proximate a wheel of a vehicle. In some examples, the electronic brake caliper assembly can comprise a brake caliper, one or more brake pads, mounted in the brake caliper, the one or more brake pads to generate friction on a brake rotor detachably coupled to the wheel, a brake actuator configured to apply a force to the one or more brake pads, and a caliper electronic control unit (CECU), in communication with a wheel speed sensor and an executive motion unit (EMU), the CECU configured to receive a target slip ratio from the EMU and a wheel speed from the wheel speed sensor and to send a first signal to the brake actuator to modulate the force applied to the brake pads by the brake actuator to maintain a slip ratio based at least in part on the target slip ratio.

B. The electronic brake caliper as is paragraph A, an inertial measurement unit (IMU) to measure at least the measured yaw rate of the vehicle and a steering angle sensor to measure a current steering angle of the vehicle wherein the EMU determines when the vehicle has deviated from an expected trajectory based at least in part on a comparison between a measured yaw rate of the vehicle and an expected yaw rate of the vehicle, and wherein the expected yaw rate is calculated based at least in part on the current steering angle.

C. The electronic brake caliper as in paragraph A or B, further comprising a steering system to control a steering angle of the vehicle, wherein the EMU sends a second signal to the steering system to change the current steering angle based at least in part on determining that the vehicle has deviated from the expected trajectory.

D. The electronic brake caliper as in any one of paragraphs A-C, wherein the EMU sends a second signal to the CECU to change the force applied to the one or more brake pads based at least in part on a determining that the vehicle has deviated from an expected trajectory.

E. The electronic brake caliper as in any one of paragraphs A-D further comprising a plurality of sensors, disposed on one or more outer surfaces of the vehicle, the plurality of sensors in communication with the EMU to provide sensor data to the EMU, and planner data, stored in a memory accessible to the EMU, the planner data comprising information about a planned trajectory for the vehicle to follow, wherein the EMU compares the sensor data to the planner data to determine if the vehicle is on the planned trajectory.

F. The electronic brake caliper as in any one of paragraphs A-E, the brake actuator comprising an electric motor comprising two or more windings, wherein each winding of the two or more windings is independently capable of generating the force.

G. The electronic brake caliper as in any one of paragraphs A-F, the CECU comprising two or more motor controllers, each motor controller configured to control one winding of the two or more windings independently.

H. A method comprising receiving, at a caliper electronic control unit (CECU) located proximate an electronic brake caliper of a vehicle, a first signal from an executive motion unit (EMU) to provide a first braking force at a wheel of a vehicle, sending, from the CECU to a brake actuator on the electronic brake caliper, a second signal to cause the brake actuator to apply the first braking force to a brake pad on the electronic brake caliper to generate a braking torque on a brake rotor, receiving, at the CECU, a third signal from a wheel speed sensor indicative of a current wheel speed of the vehicle, comparing, with the CECU, the current wheel speed to an expected wheel speed, and sending, from the CECU to the brake actuator, a fourth signal to cause the brake actuator to apply a second braking force to the brake pad based at least in part on the comparison of the current wheel speed to the expected wheel speed.

I. The method as in paragraph H, wherein the first signal further comprises a current vehicle speed, and wherein comparing the current wheel speed to the expected wheel speed comprises: comparing the current wheel speed to the current vehicle speed to calculate a current slip ratio, and comparing the current slip ratio to a target slip ratio determined by the EMU.

J. The method as in paragraphs H or I, wherein the current slip ratio is lower than the target slip ratio, and wherein the second braking force is higher than the first braking force.

K. The method as in any one of paragraphs H-J, wherein the current slip ratio is higher than the target slip ratio, and wherein the second braking force is lower than the first braking force.

L. The method as in any one of paragraphs H-K, further comprising determining, at the EMU, that a current orientation of a vehicle is different than an expected orientation, and sending, from the EMU to the CECU, a fifth signal to cause the CECU to apply a third braking force to generate differential braking to return the vehicle to the expected orientation.

M. The method as in any one of paragraphs H-L, wherein the current orientation of the vehicle is determined by a localizer system and an expected orientation is determined by a planner system, the method further comprising: sending, from the EMU to a steering system of the vehicle, a signal to cause the steering system to change a current steering angle to return the vehicle to the expected orientation.

N. A non-transitory computer readable medium containing program instructions for causing a caliper electronic control unit (CECU) on a vehicle to perform a method of receiving a first signal to provide braking from an executive motion unit (EMU), sending a second signal to a brake actuator of an electronic brake caliper to apply a first force to a brake pad on the electronic brake caliper to create a first braking torque on a brake rotor mechanically coupled to a wheel, receiving a third signal from a wheel speed sensor located proximate the wheel indicative of a current speed of the wheel, comparing a current wheel speed to an expected wheel speed, and sending a fourth signal to the brake actuator to apply a second force in response to the comparison of the current wheel speed to the expected wheel speed.

O. The non-transitory computer readable medium of paragraph N, wherein comparing a current wheel speed to the expected wheel speed comprises: receiving a current vehicle speed from the EMU, comparing the current wheel speed to the current vehicle speed to determine a current slip ratio, and comparing the current slip ratio to a target slip ratio.

P. The non-transitory computer readable medium of paragraphs N and O, wherein the EMU is a first EMU, the method further comprising receiving a redundant signal from a second EMU, the program instructions further causing the CECU to perform the method of: comparing the first signal to the redundant signal, and determining that the first signal and the redundant signal are the same prior to sending the second signal to the brake actuator, wherein the first force is based at least in part on the first signal from the first EMU.

Q. The non-transitory computer readable medium of any one of paragraphs N-P, wherein the EMU is a first EMU, the method further comprising receiving a redundant signal from a second EMU, the program instructions further causing the CECU to perform the method of: comparing the first signal to the redundant signal, and determining that the first signal and the second signal are not the same, wherein sending the second signal is based at least in part on a failsafe slip rate.

R. The non-transitory computer readable medium of any one of paragraphs N-Q, wherein the brake actuator comprises an electric motor with two or more windings, wherein the CECU comprises two or more electric motor controllers, each of the two or more electric motor controllers controlling one of the two or more windings independently, and wherein sending the second signal to the brake actuator comprises: sending a first brake signal to a first winding of the two or more windings from a first controller of the two or more electric motor controllers, and sending a second brake signal to a second winding of the two or more windings from a second controller of the two or more electric motor controllers.

S. The non-transitory computer readable medium of any one of paragraphs N-R, wherein each winding of the two or more windings is independently capable of generating the first force and the second force.

T. The non-transitory computer readable medium of any one of paragraphs N-S, the program instructions further causing the CECU to perform the method of: sending a third signal to the brake actuator to apply a third force to cause a current slip ratio to equal 1, wherein EMU calculates a target slip ratio based in part on the third force.

What is claimed is:

1. A method comprising:
   receiving, at a caliper electronic control unit (CECU) located proximate an electronic brake caliper of a vehicle, a first signal from an executive motion unit (EMU) to provide a first braking force at a wheel of a vehicle;
   sending, from the CECU to a brake actuator on the electronic brake caliper, a second signal to cause the brake actuator to apply the first braking force to a brake pad on the electronic brake caliper to generate a braking torque on a brake rotor;
   receiving, at the CECU, a third signal from a wheel speed sensor indicative of a current wheel speed of the vehicle;
   comparing, with the CECU, the current wheel speed to an expected wheel speed; and
   sending, from the CECU to the brake actuator, a fourth signal to cause the brake actuator to apply a second braking force to the brake pad based at least in part on the comparison of the current wheel speed to the expected wheel speed.

2. The method of claim 1, wherein the first signal further comprises a current vehicle speed; and
   wherein comparing the current wheel speed to the expected wheel speed comprises:
      comparing the current wheel speed to the current vehicle speed to calculate a current slip ratio; and
      comparing the current slip ratio to a target slip ratio determined by the EMU.

3. The method of claim 2, wherein the current slip ratio is lower than the target slip ratio; and
   wherein the second braking force is higher than the first braking force.

4. The method of claim 2, wherein the current slip ratio is higher than the target slip ratio; and
   wherein the second braking force is lower than the first braking force.

5. The method of claim 1, further comprising:
   determining, at the EMU, that a current orientation of a vehicle is different than an expected orientation; and
   sending, from the EMU to the CECU, a fifth signal to cause the CECU to apply a third braking force to generate differential braking to return the vehicle to the expected orientation.

6. The method of claim 5, wherein the current orientation of the vehicle is determined by a localizer system and an expected orientation is determined by a planner system, the method further comprising:
   sending, from the EMU to a steering system of the vehicle, a signal to cause the steering system to change a current steering angle to return the vehicle to the expected orientation.

7. A non-transitory computer readable medium containing program instructions for causing a caliper electronic control unit (CECU) on a vehicle to perform a method of:
   receiving a first signal to provide braking from an executive motion unit (EMU);
   sending a second signal to a brake actuator of an electronic brake caliper to apply a first force to a brake pad on the electronic brake caliper to create a first braking torque on a brake rotor mechanically coupled to a wheel;
   receiving a third signal from a wheel speed sensor located proximate the wheel indicative of a current wheel speed of the wheel;
   comparing the current wheel speed to an expected wheel speed; and
   sending a fourth signal to the brake actuator to apply a second force in response to the comparison of the current wheel speed to the expected wheel speed.

8. The non-transitory computer readable medium of claim 7, wherein comparing the current wheel speed to the expected wheel speed comprises:
   receiving a current vehicle speed from the EMU;
   comparing the current wheel speed to the current vehicle speed to determine a current slip ratio; and
   comparing the current slip ratio to a target slip ratio.

9. The non-transitory computer readable medium of claim 7, wherein the EMU is a first EMU, the method further comprising receiving a redundant signal from a second EMU, the program instructions further causing the CECU to perform the method of:
   comparing the first signal to the redundant signal; and
   determining that the first signal and the redundant signal are the same prior to sending the second signal to the brake actuator;
   wherein the first force is based at least in part on the first signal from the first EMU.

10. The non-transitory computer readable medium of claim 7, wherein the EMU is a first EMU, the method further comprising receiving a redundant signal from a second EMU, the program instructions further causing the CECU to perform the method of:
    comparing the first signal to the redundant signal; and
    determining that the first signal and the second signal are not the same;
    wherein sending the second signal is based at least in part on a failsafe slip rate.

11. The non-transitory computer readable medium of claim 7,
    wherein the brake actuator comprises an electric motor with two or more windings;
    wherein the CECU comprises two or more electric motor controllers, each of the two or more electric motor controllers controlling one of the two or more windings independently; and wherein sending the second signal to the brake actuator comprises:
sending a first brake signal to a first winding of the two or more windings from a first controller of the two or more electric motor controllers; and
sending a second brake signal to a second winding of the two or more windings from a second controller of the two or more electric motor controllers.

12. The non-transitory computer readable medium of claim 11, wherein each winding of the two or more windings is independently capable of generating the first force and the second force.

13. The non-transitory computer readable medium of claim 7, the program instructions further causing the CECU to perform the method of:
sending a third signal to the brake actuator to apply a third force to cause a current slip ratio to equal 1;
wherein EMU calculates a target slip ratio based in part on the third force.

14. A system comprising:
an electronic brake caliper assembly, mounted proximate a wheel of a vehicle, the electronic brake caliper assembly comprising:
a brake caliper;
one or more brake pads, mounted in the brake caliper, the one or more brake pads to generate friction on a brake rotor mechanically coupled to the wheel;
a brake actuator configured to apply a force to the one or more brake pads; and
a caliper electronic control unit (CECU), in communication with a wheel speed sensor and an executive motion unit (EMU), the CECU configured to:
receive a first signal to provide braking from the EMU;
send a second signal to the brake actuator of the electronic brake caliper assembly to apply a first force to a brake pad of the one or more brake pads on the electronic brake caliper assembly to create a first braking torque on the brake rotor mechanically coupled to the wheel;
receive a third signal from the wheel speed sensor located proximate the wheel indicative of a current wheel speed of the wheel;
compare the current wheel speed to an expected wheel speed; and
send a fourth signal to the brake actuator to apply a second force in response to the comparison of the current wheel speed to the expected wheel speed.

15. The system of claim 14, wherein comparing the current wheel speed to the expected wheel speed comprises:
receiving a current vehicle speed from the EMU;
comparing the current wheel speed to the current vehicle speed to determine a current slip ratio; and
comparing the current slip ratio to a target slip ratio.

16. The system of claim 14, wherein the EMU is a first EMU, the CECU further configured to:
receive a redundant signal from a second EMU,
compare the first signal to the redundant signal; and
determine that the first signal and the redundant signal are the same prior to sending the second signal to the brake actuator;
wherein the first force is based at least in part on the first signal from the first EMU.

17. The system of claim 14,
wherein the brake actuator comprises an electric motor with two or more windings;
wherein the CECU comprises two or more electric motor controllers, each of the two or more electric motor controllers controlling one of the two or more windings independently; and
wherein to send the second signal to the brake actuator comprises the CECU further configured to:
send a first brake signal to a first winding of the two or more windings from a first controller of the two or more electric motor controllers; and
send a second brake signal to a second winding of the two or more windings from a second controller of the two or more electric motor controllers.

18. The system of claim 17, wherein each winding of the two or more windings is independently capable of generating the first force and the second force.

19. The system of claim 14, the CECU further configured to:
send a third signal to the brake actuator to apply a third force to cause a current slip ratio to equal 1;
wherein EMU calculates a target slip ratio based in part on the third force.

* * * * *